(12) United States Patent
Pattok et al.

(10) Patent No.: US 7,188,533 B2
(45) Date of Patent: *Mar. 13, 2007

(54) APPARATUS FOR SENSING POSITION AND/OR TORQUE

(75) Inventors: Eric D Pattok, Saginaw, MI (US); Mohammad S Islam, Saginaw, MI (US); Matthew W Mielke, Saginaw, MI (US); Sainan Feng, Saginaw, MI (US); Ryan J Pavlawk, Munger, MI (US); Tomy Sebastian, Saginaw, MI (US); Christian E Ross, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 41 days.

This patent is subject to a terminal disclaimer.

(21) Appl. No.: 11/102,096

(22) Filed: Apr. 8, 2005

(65) Prior Publication Data

US 2005/0172727 A1 Aug. 11, 2005

Related U.S. Application Data

(63) Continuation of application No. 10/795,908, filed on Mar. 8, 2004, now Pat. No. 7,021,760.

(60) Provisional application No. 60/542,511, filed on Feb. 6, 2004, provisional application No. 60/477,482, filed on Jun. 10, 2003.

(51) Int. Cl.
  *G01N 19/08* (2006.01)
(52) U.S. Cl. ........................................ 73/799
(58) Field of Classification Search .................. 73/799

See application file for complete search history.

(56) References Cited

U.S. PATENT DOCUMENTS

| 3,671,841 | A | * | 6/1972 | Hoffmann ................... 318/696 |
| 4,784,002 | A | | 11/1988 | Io |
| 4,984,474 | A | | 1/1991 | Matsushima et al. |

(Continued)

FOREIGN PATENT DOCUMENTS

WO WO 02/071019 A1 9/2002

OTHER PUBLICATIONS

Publication entitled "Electric Power Steering (EPS)," by Yuji Kozaki, Goro Hirose, Shozo Sekiya and Yasuhiko Miyaura, Steering Technology Department, Automotive Technology Center, Motion & Control No. 6—1999.

(Continued)

*Primary Examiner*—Max Noori
(74) *Attorney, Agent, or Firm*—Michael D. Smith

(57) ABSTRACT

An apparatus for measuring relative displacement between a first shaft and a second shaft includes first and second rotor assemblies. The first rotor assembly is coupled to the first shaft and is centered on an axis. The second rotor assembly is coupled to the second shaft. The second rotor assembly has first and second stator plates. Each of the first and second stator plates includes an upper surface and a lower surface. The upper and lower surfaces are parallel. The first and second stator plates include a plurality of teeth extending in a direction radial of the axis. The first and second stator plates form a gap between the lower surface of the first stator plate and the upper surface of the second stator plate. The apparatus further includes at least one magnet having a magnetic field and disposed on the first rotor assembly and a sensing device disposed within the gap for sensing a magnetic flux of the magnetic field.

22 Claims, 23 Drawing Sheets

U.S. PATENT DOCUMENTS

| | | | |
|---|---|---|---|
| 5,465,627 A | 11/1995 | Garshelis | |
| 5,491,407 A | 2/1996 | Maxson et al. | |
| 5,493,921 A | 2/1996 | Alasafi et al. | |
| 5,520,059 A | 5/1996 | Garshelis | |
| 5,706,572 A | 1/1998 | Garshelis | |
| 5,708,216 A | 1/1998 | Garshelis | |
| 5,725,023 A | 3/1998 | Padula | |
| 5,778,703 A * | 7/1998 | Imai et al. | 68/12.02 |
| 5,887,335 A | 3/1999 | Garshells | |
| 5,889,215 A | 3/1999 | Kilmartin et al. | |
| 5,907,105 A | 5/1999 | Pinkerton et al. | |
| 6,047,605 A | 4/2000 | Garshelis | |
| 6,098,741 A | 8/2000 | Gluf, Jr. et al. | |
| 6,145,387 A | 11/2000 | Garshelis | |
| 6,169,644 B1 | 1/2001 | Ito et al. | |
| 6,222,287 B1 * | 4/2001 | Suzuki | 310/49 R |
| 6,222,290 B1 | 4/2001 | Schob et al. | |
| 6,260,423 B1 | 7/2001 | Garshelis | |
| 6,275,025 B1 | 8/2001 | Wiese | |
| 6,374,664 B1 | 4/2002 | Bauer et al. | |
| 6,424,896 B1 | 7/2002 | Lin et al. | |
| 6,460,382 B1 * | 10/2002 | Kim et al. | 68/140 |
| 6,488,115 B1 | 12/2002 | Ozsoylu et al. | |
| 6,490,934 B2 | 12/2002 | Garshelis | |
| 6,519,959 B2 * | 2/2003 | Kim et al. | 62/211 |
| 6,552,453 B2 | 4/2003 | Ohiwa et al. | |
| 6,553,847 B2 | 4/2003 | Garshelis | |
| 6,882,066 B2 * | 4/2005 | Kastinger | 310/49 R |
| 6,927,524 B2 * | 8/2005 | Pyntikov et al. | 310/254 |
| 2002/0047432 A1 * | 4/2002 | Miyashita et al. | 310/156.48 |
| 2002/0189371 A1 | 12/2002 | Nakane et al. | |
| 2003/0037622 A1 | 2/2003 | Laidlaw | |
| 2003/0141773 A1 * | 7/2003 | Abel | 310/90.5 |
| 2004/0011138 A1 | 1/2004 | Gandel et al. | |

OTHER PUBLICATIONS

Publication entitled "Magnasteer Power Steering," author unknown, General Motors Tech Link, vol. 2, No. 12, Dec. 2000.

Publication entitled "Understanding & Servicing Magnasteer, Larry Carley, Brake and Front End," author unknown, General Motors, Feb. 2002.

Publication entitled "amploc current sensors—Engineers' Reference Handbook," author unknown, dated 2002.

Web page print-out entitled "The Hall Effect," author unknown, www.sensorland.com.

Publication entitled "Variable-Effort Steering Systems, Magnasteer Magnetic Assist Steering," Delphi Corporation, 2002.

Publication entitled "Variable-Effort Steering Systems Magnasteer II Magnetic Assit Steering," Delphi Corporation, 2002.

Publication entitled "Electric Steering Systems E-STEER Electric Power Steering," Delphi Corporation, 2002.

* cited by examiner

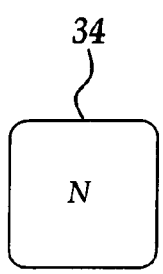
*Figure 12A*
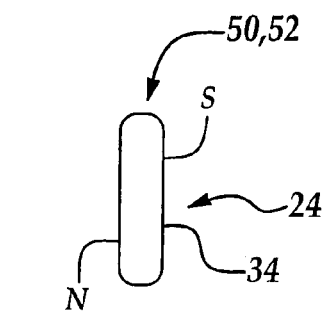
*Figure 12B*
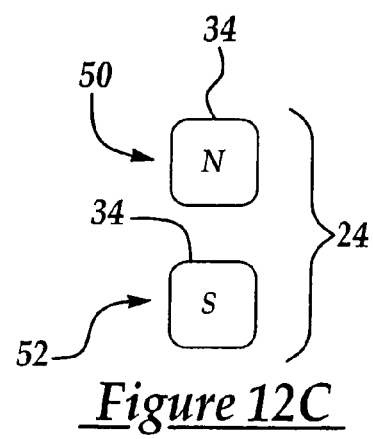
*Figure 12C*
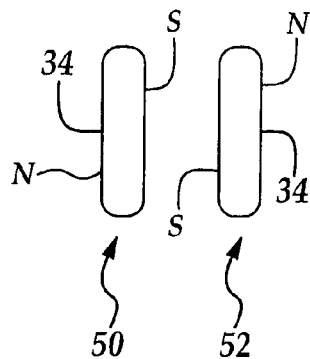
*Figure 12D*
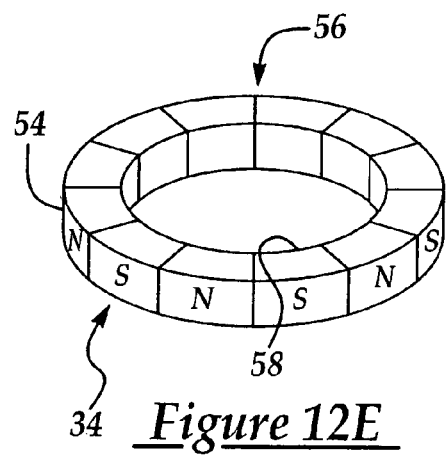
*Figure 12E*
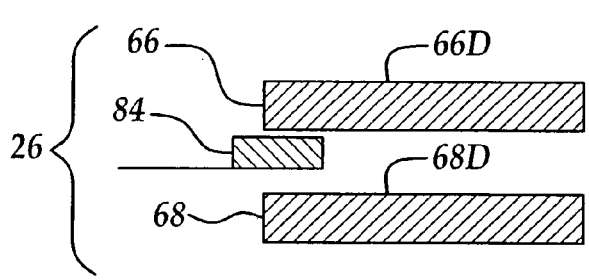
*Figure 13*
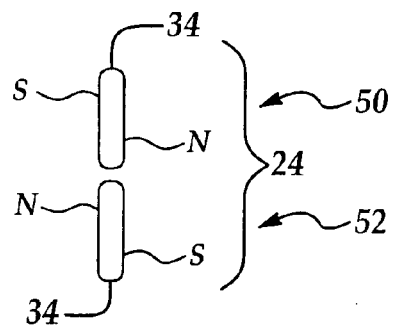
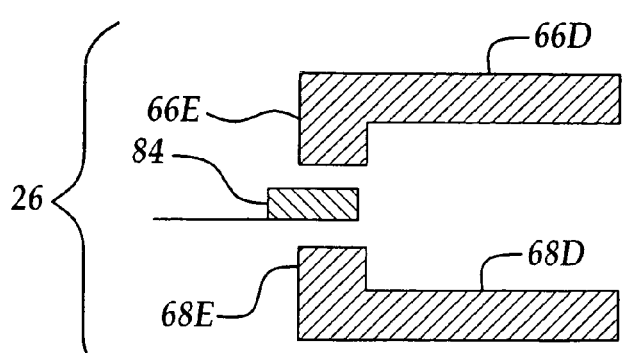
*Figure 14*
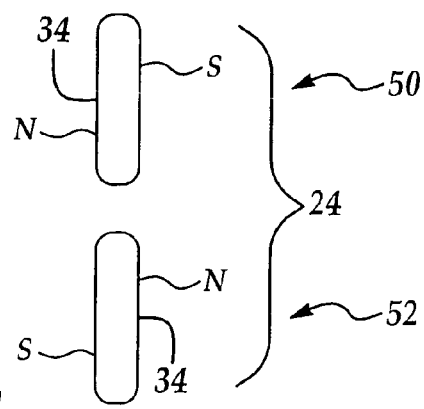

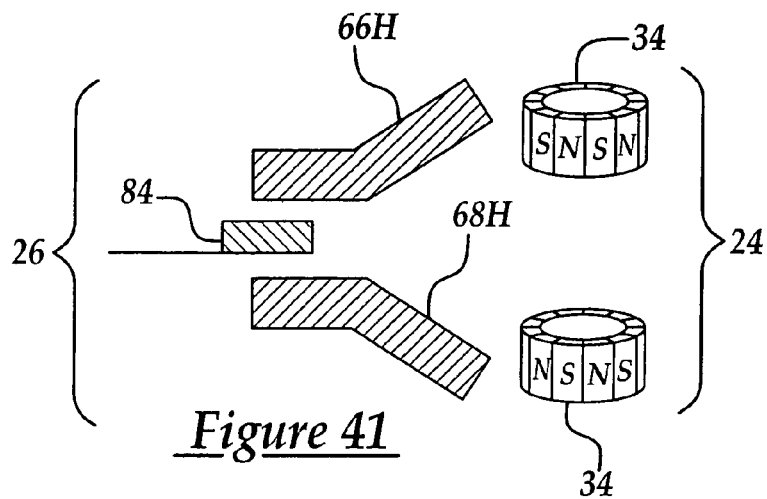
_Figure 41_
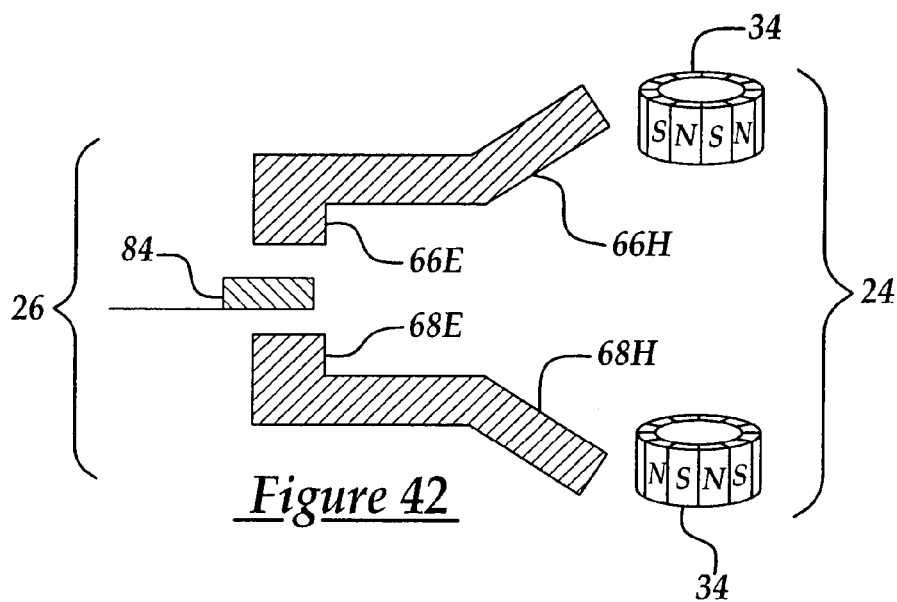
_Figure 42_
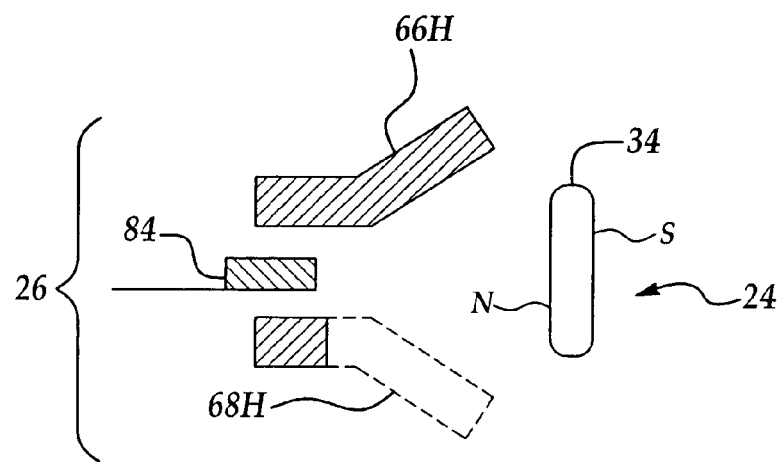
_Figure 43_

APPARATUS FOR SENSING POSITION AND/OR TORQUE

This application is a continuation of U.S. patent application Ser. No. 10/795,908, filed Mar. 8, 2004 now U.S. Pat. No. 7,021,160 which claims priority to U.S. Provisional Patent Application Ser. No. 60/477,482 filed Jun. 10, 2003, and U.S. Provisional Patent Application Ser. No. 60/542,511 filed Feb. 6, 2004.

FIELD OF THE INVENTION

The present invention relates generally to apparatus for sensing position and/or torque and more particularly to an apparatus for sensing angular displacement between first and second rotating shafts.

BACKGROUND OF THE INVENTION

It is frequently important to measure or sense an angular displacement and/or relative torque between first and second shafts. The relative displacement may be measured by a small angle displacement sensor. The relative position may then be used to derive the torque applied between the two shafts.

For example, power steering systems in motor vehicles and the like are designed to provide appropriate hydraulic or electrical assist to allow a driver to complete a turn of the motor vehicle. The driver typically turns a steering wheel which is connected to a first shaft. The first shaft is coupled to a second shaft which is connected to a steering mechanism. The first and second shafts may be coupled by a compliant member, such as a torsion bar. Typically, the first shaft may rotate with respect to the second shaft by a predetermined number of degrees, e.g., +/−12 degrees. Mechanical stops may prevent further movement. The amount of assist is determined as a function of the amount of torque being applied to the first shaft.

Many types of position sensors utilize one or more magnets for generating a magnetic field. The magnetic circuit typically includes a second magnetic structure which forms a gap. A sensing device, disposed within the gap, detects changes in the magnetic flux which is used as an indication of the relative displacement between the first and second shafts.

One such system is disclosed in U.S. Patent Application 20040011138, published Jan. 22, 2004 (hereafter "Gandel"). The second magnetic structure in Gandel is made up of two ferromagnetic rings, each having a plurality of axially oriented teeth. Each rings includes a circular flux-closing zone, which is parallel to the flux-closing zone of the other ring. The teeth of the rings are generally perpendicular to the flux-closing zones and are interleaved.

One inherent problem with the Gandel device is that it is sensitive to mechanical misalignment during assembly. Specifically, the axial teeth of the rings require very accurate placement with respect to each other. A deviation in the relative position of the rings and teeth with respect to each other will cause reduced performance of the device. It is difficult to accurately align the teeth of the rings and to maintain their relative position to maintain the correct distance from tooth to tooth.

Another disadvantage of the Gandel device is that it is sensitive to mechanical variation during operation. The device is sensitive to angular and parallel changes in the relationship of the two rotors to one another. Mechanical variation in these two directions will cause variation in the output.

Another disadvantage of the Gandel device is an output variation over 360°. This variation is caused by the magnetic structure of the device and the measurement location of the magnetosensitive elements.

Another inherent problem with the rings of the Gandel device is that they are complex and difficult and costly to manufacture.

The present invention is aimed at one or more of the problems identified above.

SUMMARY OF THE INVENTION

In a first aspect of the present invention, a rotor assembly for use in a sensor for measuring relative position between first and second shaft is provided. The rotor assembly includes first and second stator plates. The first stator plate has an upper surface and a lower surface. The second stator plate has an upper surface and a lower surface. The first and second stator plates include a plurality of teeth extending in a direction radial of an axis. The first and second stator plates form a gap between the lower surface of the first stator plate and the upper surface of the second stator plate. The gap has a uniform thickness. The rotor assembly further includes a retaining member to hold the orientation and spacing of the first and second stator plates relative to each other.

In a second aspect of the present invention, a rotor assembly for use in a sensor for measuring the relative position between first and second shafts is provided. The rotor assembly includes a rotor centered on an axis. The rotor has an inner surface and an outer surface. The outer surface forms at least one slot associated with an outer radius. The inner surface forms at least one support structure associated with an inner radius.

In a third aspect of the present invention, an apparatus for measuring relative position between a first shaft and a second shafts is provided. The apparatus includes first and second rotor assemblies. The first rotor assembly is coupled to the first shaft and is centered on an axis. The second rotor assembly is coupled to the second shaft. The second rotor assembly has first and second stator plates. Each of the first and second stator plates includes an upper surface and a lower surface. The upper and lower surfaces are parallel. The first and second stator plates include a plurality of teeth extending in a direction radial of the axis. The first and second stator plates form a gap between the lower surface of the first stator plate and the upper surface of the second stator plate. The apparatus further includes at least one magnet having a magnetic field and disposed on the first rotor assembly and at least one sensing device disposed within the gap for sensing a change in the magnetic field.

BRIEF DESCRIPTION OF THE DRAWINGS

Other advantages of the present invention will be readily appreciated as the same becomes better understood by reference to the following detailed description when considered in connection with the accompanying drawings wherein:

FIG. 11A is a diagrammatic illustration of a second rotor assembly of the apparatus of FIG. 1A, according to a third embodiment of the present invention;

FIG. 11B is a partial top view of the second rotor assembly of FIG. 11A;

FIG. 11C is a front view of the second rotor assembly of FIG. 11A;

FIG. 12A is a top view of a square magnet;

FIG. 12B is a side view of the magnet of FIG. 12A;

FIG. 12C is a top view of a plurality of magnets arranged in parallel rows;

FIG. 12D is a side view of the magnet of FIG. 12C;

FIG. 12E is a three-dimensional view of a ring magnet with a plurality of north-south pole pairs;

FIG. 13 is a diagrammatic illustration of a cross-sectional view of the apparatus of FIG. 1A, according to a first embodiment of the present invention;

FIG. 14 is a diagrammatic illustration of a cross-sectional view of the apparatus of FIG. 1A, according to a second embodiment of the present invention;

FIG. 41 is a diagrammatic illustration of a cross-sectional view of the apparatus of FIG. 1A, according to a twenty-ninth embodiment of the present invention;

FIG. 42 is a diagrammatic illustration of a cross-sectional view of the apparatus of FIG. 1A, according to a thirtieth embodiment of the present invention;

FIG. 43 is a diagrammatic illustration of a cross-sectional view of the apparatus of FIG. 1A, according to a thirty-first embodiment of the present invention;

DETAILED DESCRIPTION OF THE INVENTION

Figures 1A, 1B:
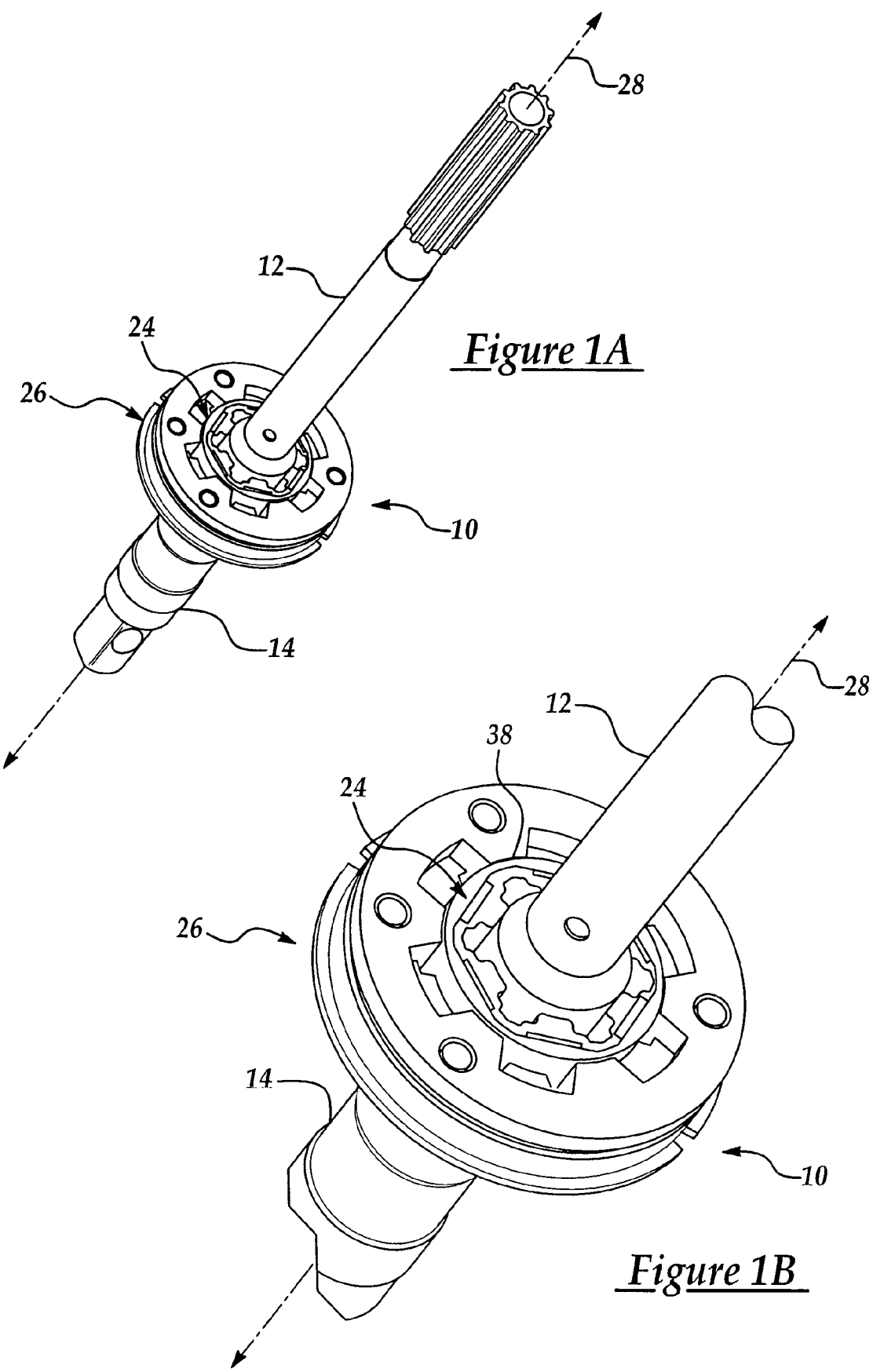
FIG. 1A is an illustration of an apparatus for sensing a relative position between a first shaft and a second shaft, according to an embodiment of the present invention.
FIG. 1B is an enlarged illustration of the position sensing apparatus of FIG. 1A.

With reference to the Figures and in operation, an apparatus 10 senses the relative position between a first shaft 12 and a second shaft 14. The relative position may then be used to derive the torque applied between the first and second shafts 12, 14.

In the illustrated embodiment, the apparatus 10 may be used in an power steering system 16 to provide a measurement of input torque generated by a driver turning a steering wheel (not shown). The input torque is used to provide appropriate hydraulic or electrical assist to allow the driver to complete a turn with minimal effort, but increased stability. The first shaft 12 is connected to the steering wheel. The second shaft 14 is coupled to a steering system (not shown), for example, as a rack and pinion gear mechanism. As is known in the art, a compliant member such as a torsion bar 18 couples the first and second shafts 12, 14. The first and second shafts 12, 14 are moveable relative to each other through a predetermined range, e.g., ±8 or ±12 degrees. It should be noted that the range of relative movement will be dependent upon application. The present invention is not limited to any given range of relative movement.

Mechanical stops 20 restrict further relative movement between the first and second shafts 12, 14. A position sensor may be used to measure rotation of the first or second shafts 12, 14. The position sensor may be a contact or non-contact sensor. The apparatus 10 may contained within a housing 22, which may also contain portions of the first and second shafts 12, 14 and components of the power steering system. Such steering systems 16 are well known in the art and are, therefore, not further discussed.

In one aspect of the present invention, the apparatus 10 includes a first rotor assembly 24 and a second rotor assembly 26. The first rotor assembly 24 is coupled to the first shaft 12 and is centered on an axis 28. The second rotor assembly 26 is coupled to the second shaft 14. The first and second rotor assemblies 24, 26 are coaxial.

With specific reference to FIGS. 2A, 2B, 7A, 7B, 7C, the first rotor assembly 24 includes a rotor 30 centered on the axis 28. In one embodiment, the rotor 30 includes a plurality of slots 32. The first rotor assembly 24 includes a plurality of magnets 34 located in each slot 32.

The magnets 34 may be affixed or held in place in any appropriate manner such as by an adhesive or crimping. In one aspect of the present invention, a retaining member 36 may be used along with, or in place of, the adhesive. The retaining member 36 is made from a non-magnetic material, such as plastic. In one embodiment, the retaining member 36 is overmolded the combined rotor 30 and magnets 34, once the magnets 34 are inserted into the slots 32.

Figure 2A:
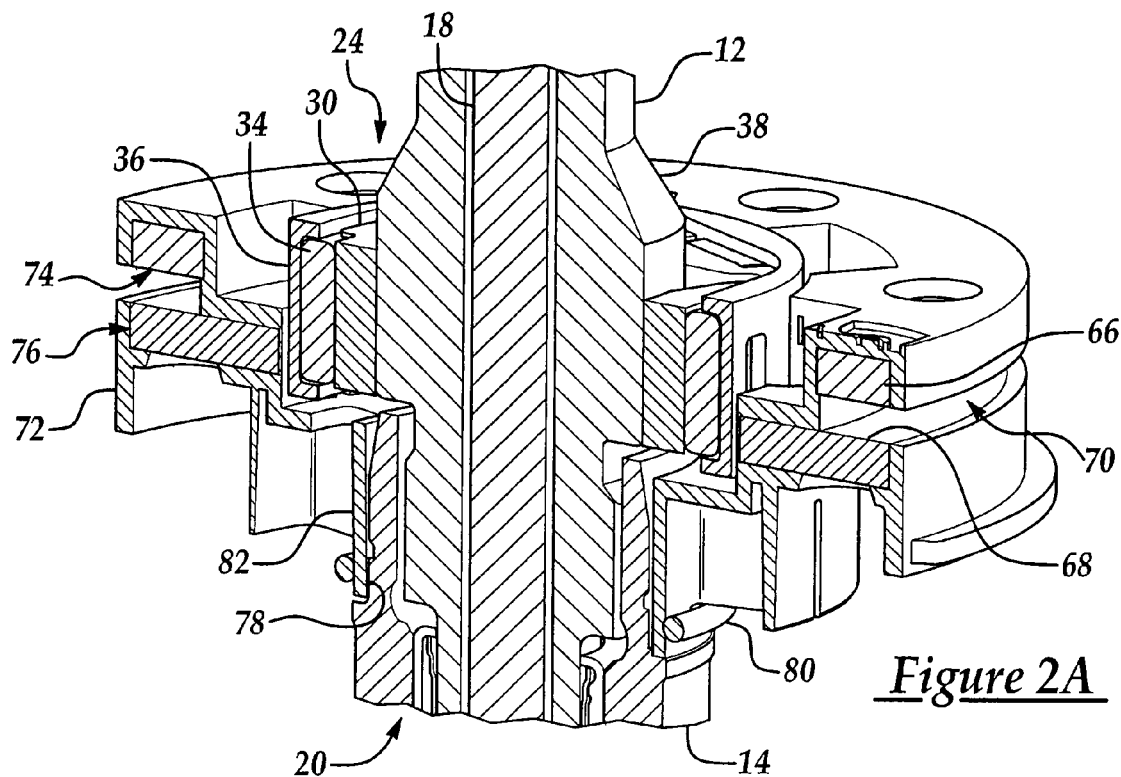
FIG. 2A is a first cut away view of the apparatus of FIG. 1A.
Figure 2B:
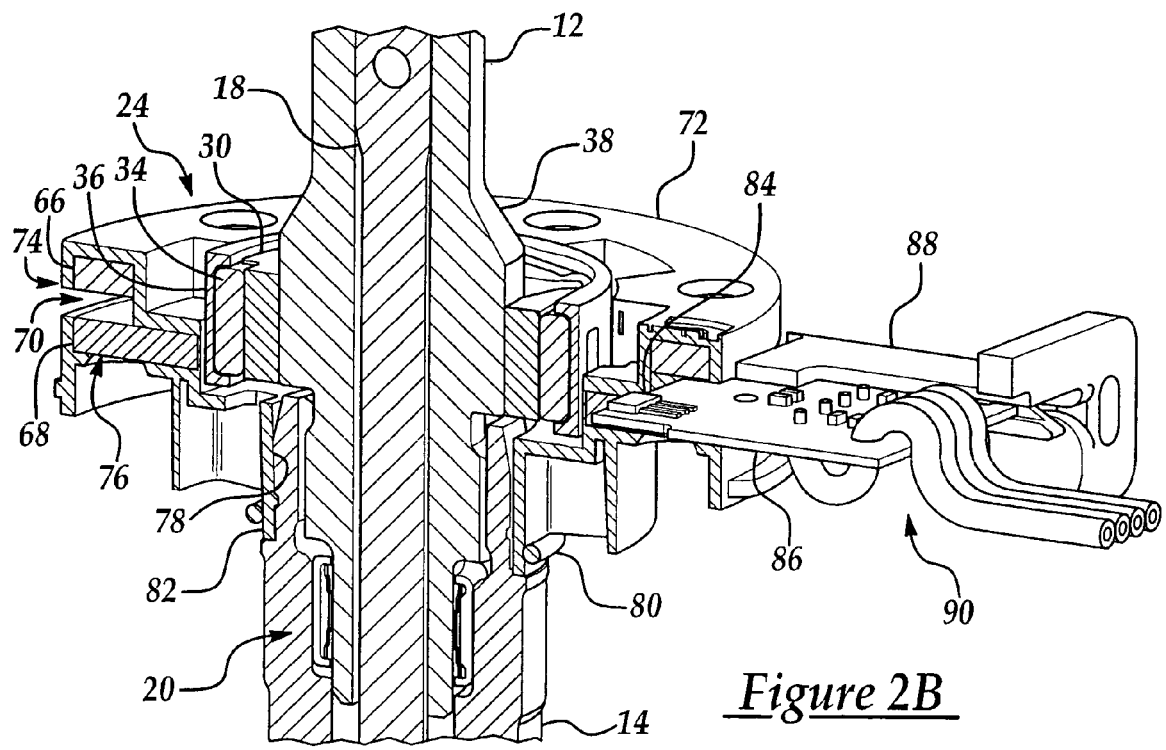
FIG. 2B is a second cut away view of the apparatus of FIG. 1A.
Figure 2C:
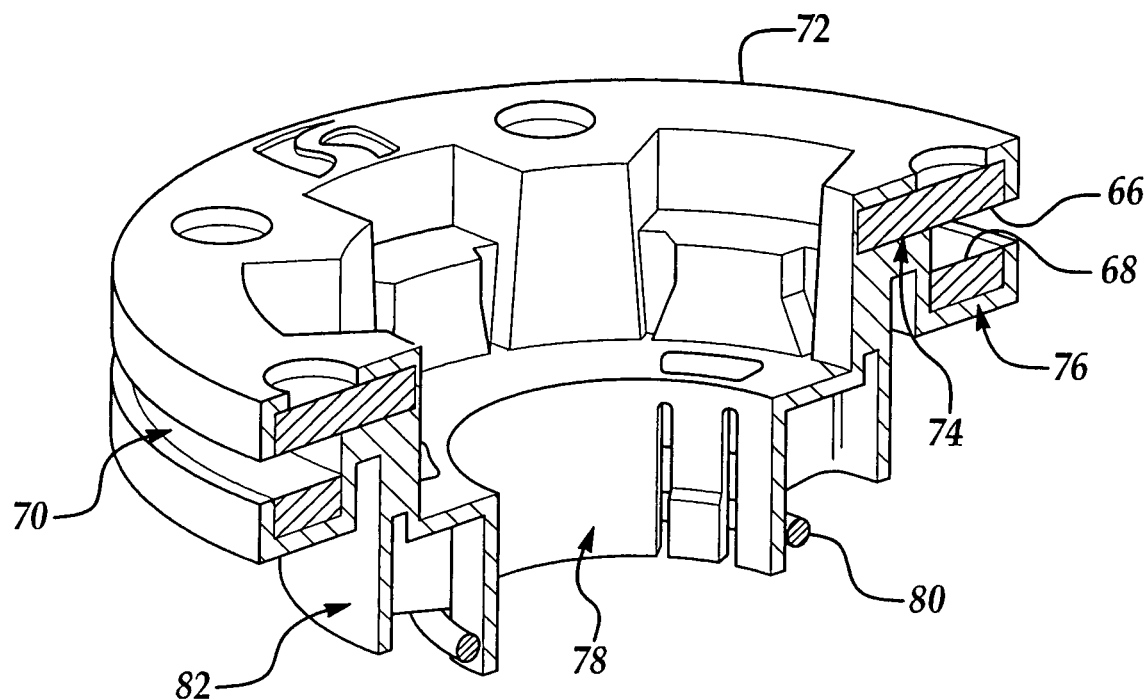
FIG. 2C is a cut away view of a portion of a rotor assembly of the apparatus of FIG. 1A.
Figure 2D:
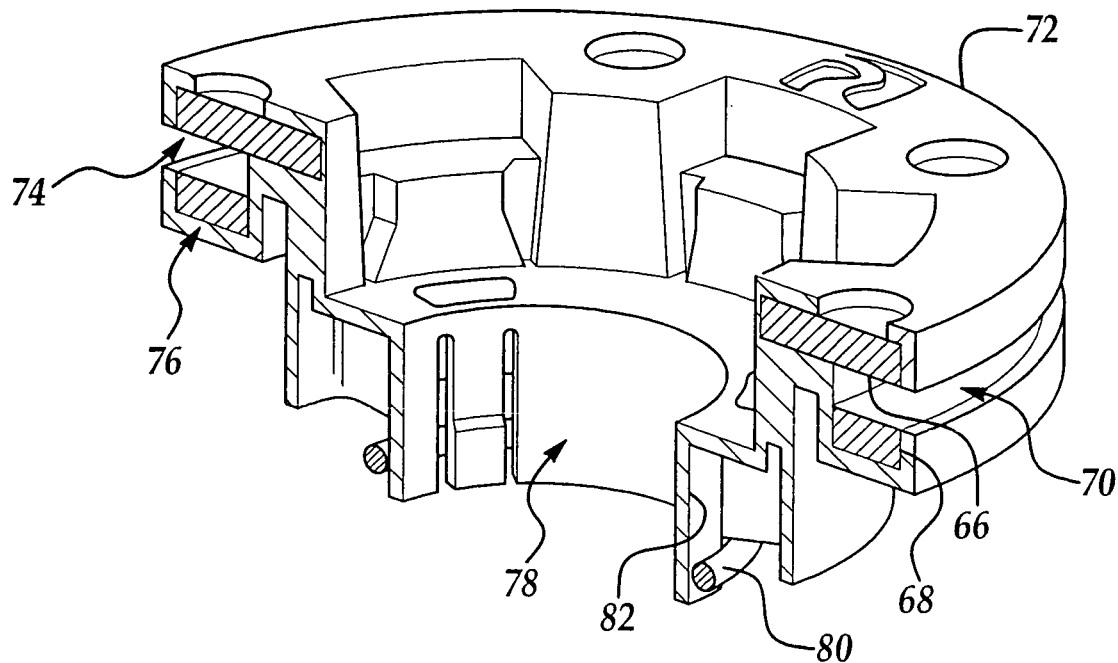
FIG. 2D is a second cut away view of a portion of a rotor assembly of the apparatus of FIG. 1A.

With specific reference to FIGS. 2A and 2B, the first rotor assembly 24 is pressed onto the first shaft 12. As shown, the first shaft 12 may have an enlarged portion 38 which forms a press-fit with the first rotor assembly 24.

The first rotor 30 is composed of a soft magnetic material, such as a nickel iron alloy. The first rotor 30 may be made using a stamping process or may be made from a powdered metal using a sintering process or through a machining process.

The rotor 30 includes an inner surface 40 and an outer surface 42. The slots 32 are formed in the outer surface 42. The inner surface 40 has an associated inner radius 44 and the outer surface 42 has an associated outer radius 46. In between the slots 32, the rotor 30 forms support structures 48. The inner radius 44 is defined by the inner surface 40 at the center of a support structure 48. In one aspect of the present invention, the inner radius 44 is greater than outer radius 46.

In the illustrated embodiment, the magnets 34 are disposed evenly around the circumference of the rotor 30. The spacing between, i.e., the width of the support structures 48, the magnets 34 are approximately the width of the magnets 34 or slots 32. The support structures 48 serves as the path the magnetic flux flows through to complete the magnetic circuit on its path through the magnets 34.

As shown, in the illustrated embodiment, top surface of the magnets 34 does not protrude beyond the support structures 48 in the axial direction.

In one embodiment, the rotor assembly 24 includes six square magnets 34, such as shown in FIG. 12A. The front surface of the magnet 34 in FIG. 12A is square. In an alternative embodiment, the front surface of the magnet 34 is rectangular.

The front surface of the magnet 34 in FIG. 12A is the North pole of the magnet 34. The back surface of the magnet 34 is the South pole. In the illustrated embodiment i.e., one of the front or back surface of the magnet 34 is adjacent the rotor 30. Four side surfaces adjoin the front and back surfaces of the magnets 34. At least one pair of edges formed by one of the front and back surfaces and the four side surfaces of the magnets 34 are rounded.

In one embodiment, all of the magnets 34 on the rotor are orientated in a similar manner, i.e., one of the North pole or the South pole is "down", i.e., adjacent the rotor 30, and the other pole, is "up". In another embodiment, the orientations of the magnets 34 are alternated, one magnet 34 is orientated "up" and the adjacent magnets 34 are orientated "down".

The first rotor assembly 24 may also include other magnet arrangements. For example, with reference to FIG. 12B, the rotor assembly 24 may include two adjacent rows 50, 52 of magnets 34. Each row 50, 52 may include a plurality of magnets 34 spaced equidistantly around the circumference of the rotor 30. Each magnet 34 in one of the rows 50, 52 may be orientated in the same direction or orientated in the opposite direction from the adjacent magnets. Alternatively, the rotor assembly 24 may include one or more ring magnets 54, as shown in FIG. 12C. The ring magnet 54 has one or more pairs of adjacent poles 56, i.e., each pair having a North pole and a South pole. The North pole of one pair being adjacent the South pole of the next pair. For example, the ring magnet 54 may have six pairs of North and South poles. The ring magnet 54 has an interior bore 58 which may surround the rotor 34. The ring magnet 54 may be affixed to the rotor 34 by an adhesive and/or the retaining member 36 and/or any suitable means. If more than one ring magnet 54 is provided, the ring magnets 54 are parallel.

The rotor 34 is designed to eliminate hoop stress. Hoop stress is eliminated by the relationship between the inner radius 44 and the outer radius 46. As shown, the rotor 34 has no sharp corners which will reduce wear on any manufacturing tools. In the illustrated embodiment, each magnet slot 32 is defined by a plane 60. A centerpoint 62 of the plane 60 is tangent to the outer radius 46. Associated with each slot 32 may also include stress relief slots 64. Additionally, a non-continuous inner diameter 47 may also eliminate hoop stress.

Figure 4:
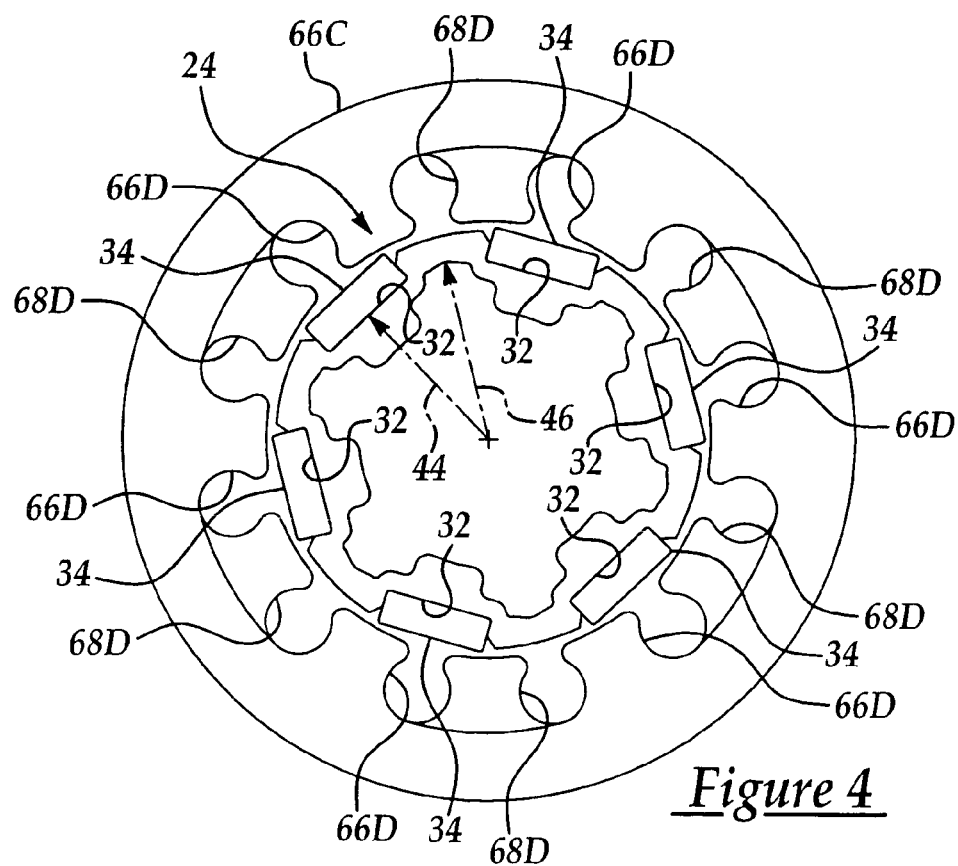
FIG. 4 is a top view of the first and second rotor assemblies of FIG. 3A.
Figure 5:
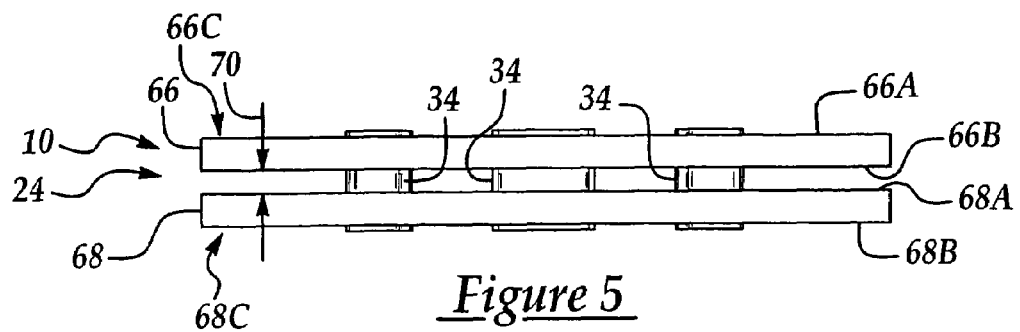
FIG. 5 is a side view of the first and second rotor assemblies of FIG. 3A.

Returning to FIGS. 2A, 2B, 3A, 4 and 5, the second rotor assembly 26 includes a first stator plate 66 and a second stator plate 68. The first and second stator plates 66, 68 are parallel to each other. As best shown in FIG. 5, the first stator plate 66 includes an upper surface 66A and a lower surface 66B. The second stator plate 68 also includes an upper surface 68A and a lower surface 68B. The upper and lower surfaces 66A, 66B, 68A, 68B are parallel. The lower surface 66B of the first stator plate 66 faces the upper surface 68A of the second stator plate 68, as shown. The first and second stator plates 66, 68 may be manufactured using a stamping process may be made from a powdered metal using a sintering process, or may be made using a machining process.

Figure 3A:
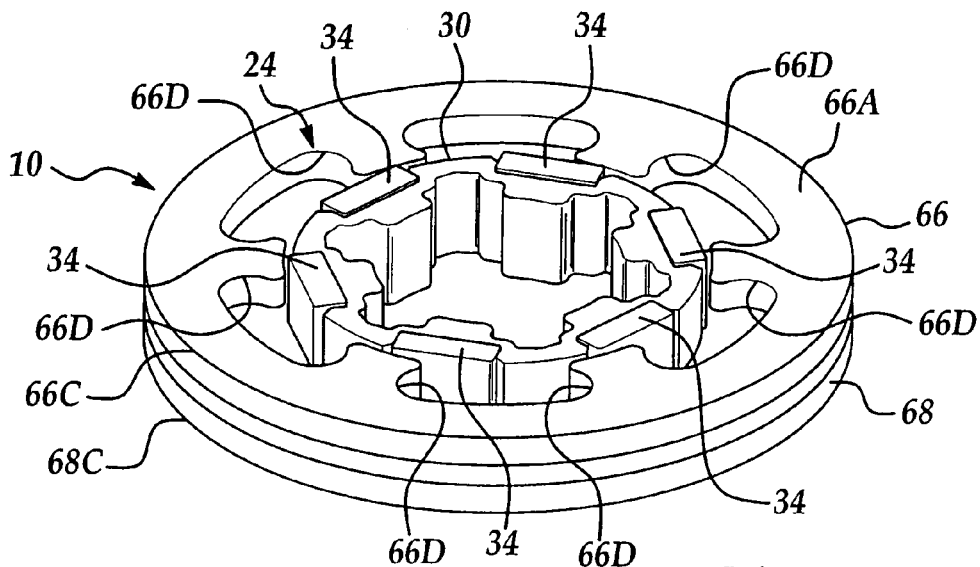
FIG. 3A is a three-dimensional view of a portion of a first and second rotor assembly of the apparatus of FIG. 1A.

As best shown in FIGS. 3A and 5, in the illustrated embodiment the first stator plate 66 includes a circular base 66C and a plurality of teeth 66D extending from the circular base 66C in a radial direction. Likewise, the second stator plate 68 includes a circular base 68C and a plurality of teeth 68D extending from the circular base 68C in a radial direction.

As discussed below, the teeth 66D, 68D of the first and second stator plates 66, 68 may be in-phase or offset from each other.

In the illustrated embodiment, the first and second plates 66, 68 are planar. As shown in FIGS. 3A and 5 the upper surface of the teeth 66D, 68D is co-planar with the upper surface 66A, 68A of the respective stator plate 66, 68 and the lower surface of the teeth 66D, 68D is co-planar with the lower surface 66B, 68B of the respective stator plate 66, 68. In other words, the teeth 66D on the first stator plate 66 do not axially intersect with the teeth 68D on the second stator plate 68, i.e., do not intersect with a common plane perpendicular to the axis 28.

As shown in FIG. 5, the first and second stator plates 66, 68 form a gap 70 between the lower surface 66B of the first stator plate 66 and the upper surface 68A of the second stator plate 68. As shown, the gap 70 has a uniform thickness.

With specific reference to FIGS. 2A, 2B, 2C, 2D, in one aspect of the present invention, the second rotor assembly 26 includes a retaining member 72. The retaining member 72 is made form a non-magnetic material, such as plastic. In one embodiment, the retaining member 72 is overmolded the first and second stator plates 66, 68. The first stator plate 66 and the second stator plate 68 are retained by the retaining member 72 which fixes the relative position thereof. The retaining member 72 retains the first and second stator plates 66, 68 in a predetermined relationship, i.e., to maintain the size of the desired gap 70 and the angular relationship between the first and second stator plates 66, 68.

The retaining member 72 also includes an inner bore 78. The retaining member 72 is slipped over the second shaft 14, the inner bore 78 forming a friction fit with the second shaft 14. The second shaft 14 may also include a number of splines (not shown) which form a spline interface with the retaining member 72. A retaining ring 80 fitted over an outer surface 82 of the retaining member 74 opposite the inner bore 78 may be used also as a redundant feature to retain the retaining member 72 on the second shaft 14.

Figure 1C:
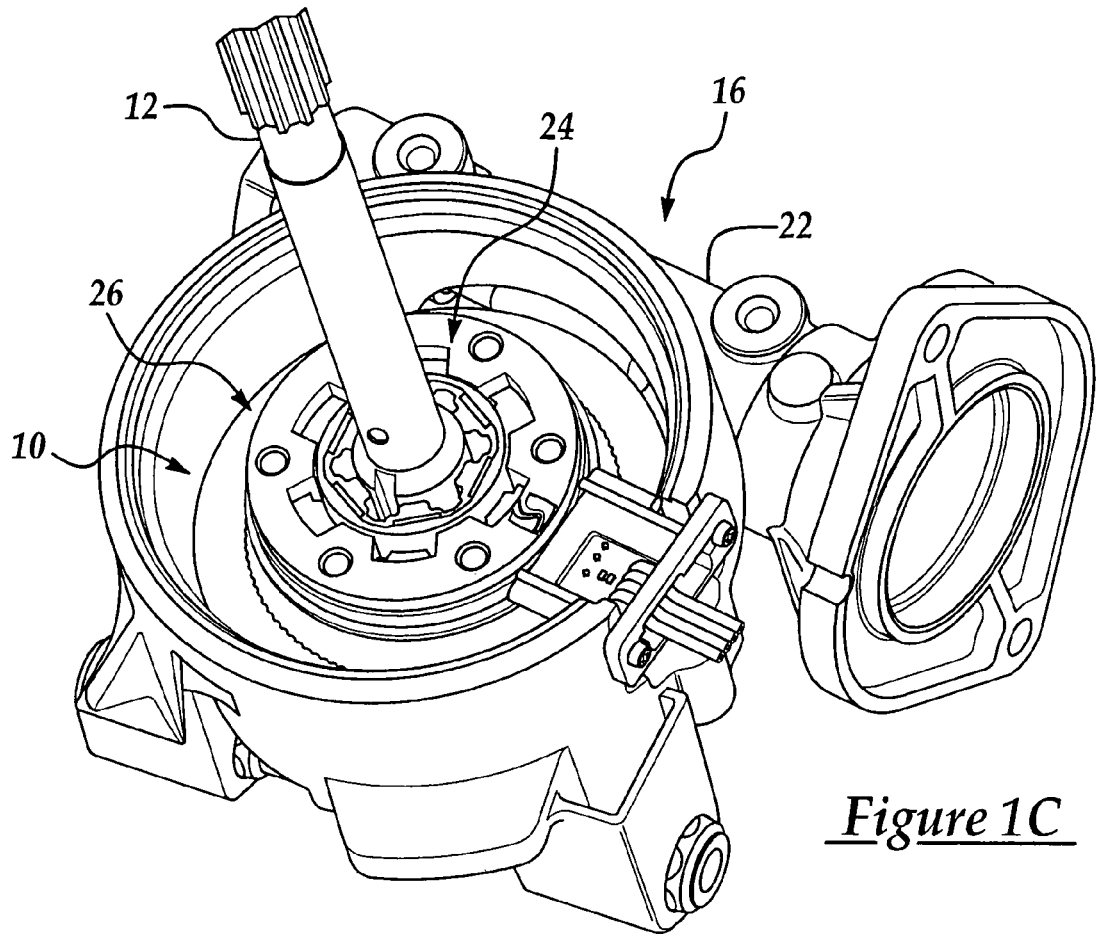
FIG. 1C is a three-dimensional illustration of the position sensing apparatus of FIG. 1A in a housing.
Figure 1D:
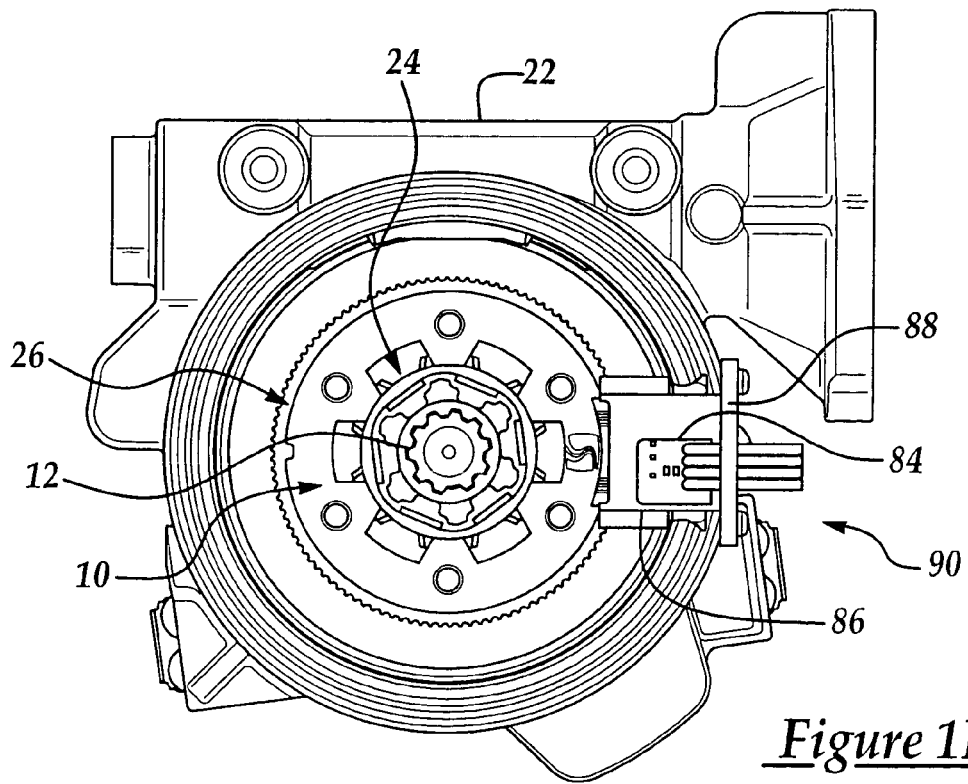
FIG. 1D is a top view of the apparatus and housing of FIG. 1C.

With particular reference to FIGS. 1C, 1D, and 2B, the apparatus 10 includes at least one sensing device 84 disposed within the gap 70 for sensing a change in magnetic flux. In the illustrated embodiment, the sensing device 84, e.g., a hall effect sensor, is mounted to a circuit board 86. The sensing device 84 and the circuit board 86 are contained with a probe housing 88. The probe housing 88 is either mounted to a stationery member (not shown) or rotationally mounted to a bearing surface (not shown) and serves to accurately position the sensing device 84 within the gap 70. A wire harness 90 provides power and delivers signals from the sensing device 84. Alternately or additionally, a wedge gage plate, or screws may be used to assist in accurately positioning the sensing device 84 in the gap 70.

As discussed above, in the illustrated embodiment, the teeth 66D, 68D of the first and second stator plates 66, 68 are offset or out-phase. The magnetic field measured by the sensing device 84 varies depending on the alignment of the magnets in the first rotor assembly 24 and the teeth 68D, 68D. As shown in FIG. 4, the radial gap between the teeth 66D, 68D and the top of the magnets 34 is greater than the gap between the teeth 66D, 68D and the top of the supporting structures 48.

Figure 6:
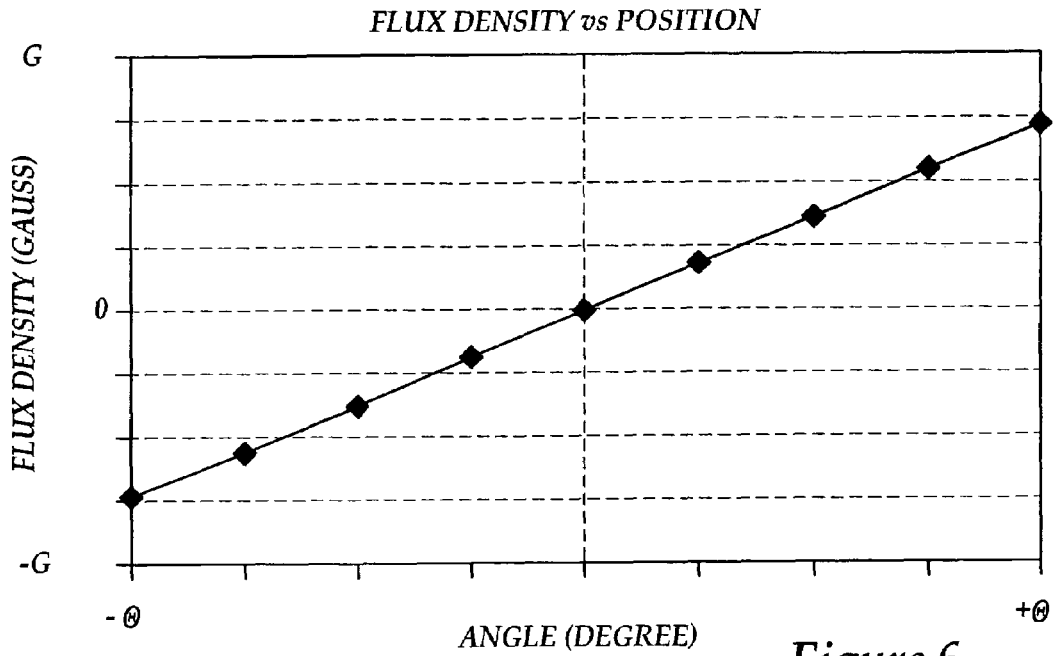
FIG. 6 is an exemplary graph illustrating angle versus flux density of the apparatus of FIG. 1A.
Figure 7A:
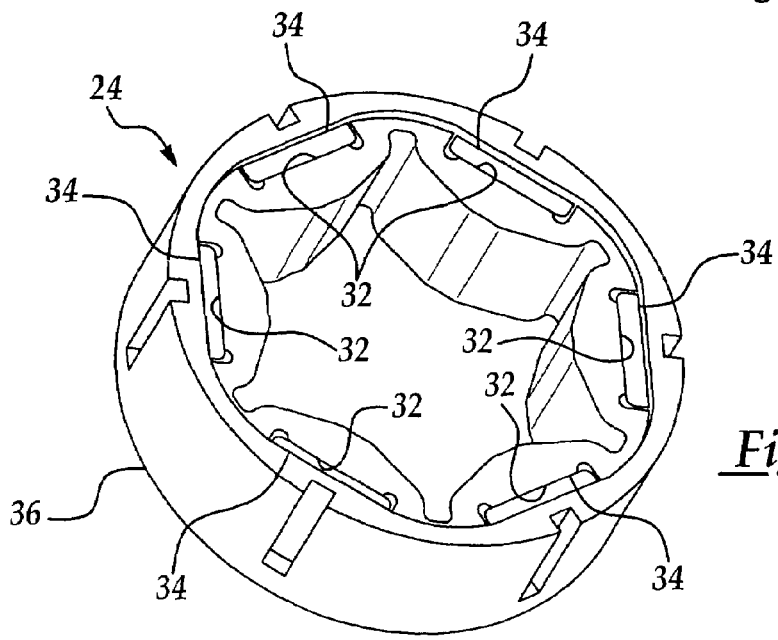
FIG. 7A is a three-dimensional illustration of a first rotor assembly of the apparatus of FIG. 1A, according to an embodiment of the present invention.
Figure 7B:
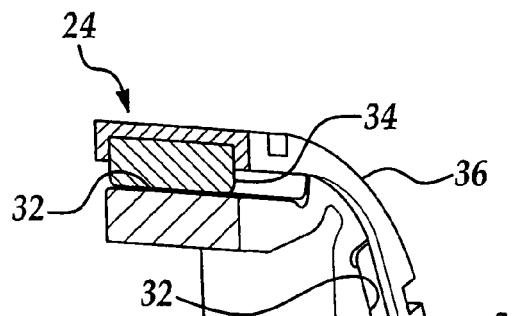
FIG. 7B is a cut away view of the first rotor assembly FIG. 7A.
Figure 7C:
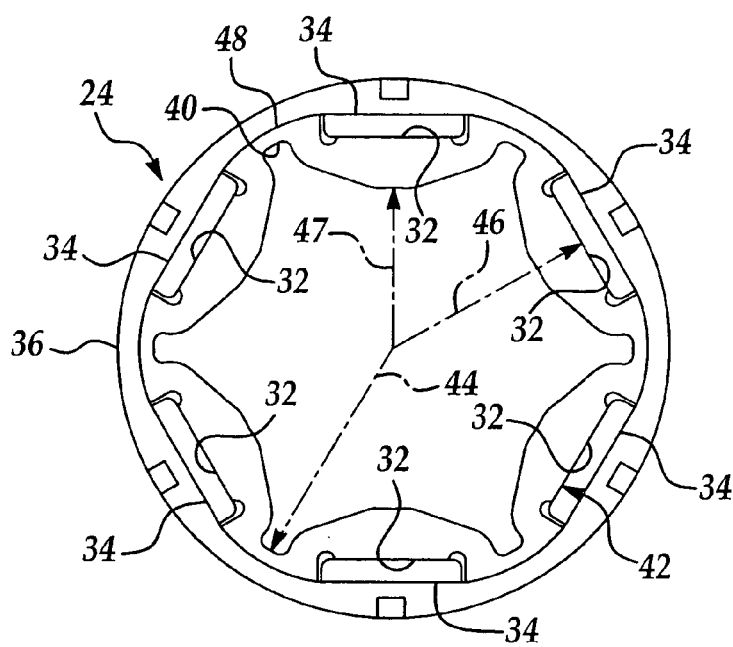
FIG. 7C is a side view of the first rotor assembly of FIG. 7A.
Figure 7D:
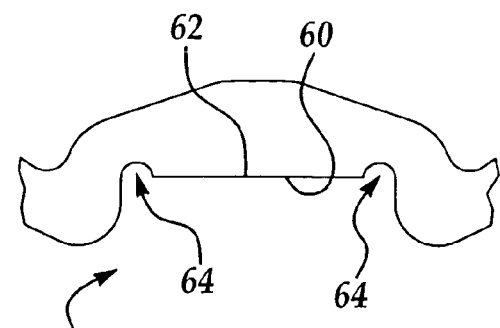
FIG. 7D is a diagrammatic illustration of a portion of a rotor of the first rotor assembly of FIG. 7A.

The magnetic circuit formed by the magnets has mainly two regions called upper magnetic zone formed between upper stator and the magnets and lower magnetic zone formed between lower stator and the magnets. The differential flux between these two zones flows through the measurement slot where magnetosensitive elements sense the field. Hence at no load torque condition, both of the zones produce the same amount of flux, hence the differential flux crossing through the gap 70 is zero. Depending on the relative displacement (+/−8 degrees) the differential flux either flows up or down in the measurement slot. With reference to FIG. 6, an exemplary graph of flux density measured by the sensing device 84 as a function of angular displacement between the first and second shafts 12, 14 is shown. At zero degrees, no torque is being on the first shaft 12 and no flux is measured. As torque is applied to the first shaft 12, the flux density measured by the sensing device 84 increases or decreases depending on the direction of travel of the first shaft 12. As shown in the example of FIG. 6, the maximum relative displacement between the first and second shafts 12, 14 is +/−θ degrees with an associated −/−G Gauss of flux density variation. It should be noted that the graph of FIG. 6 is exemplary and for illustrative purposes only.

Figure 3B:
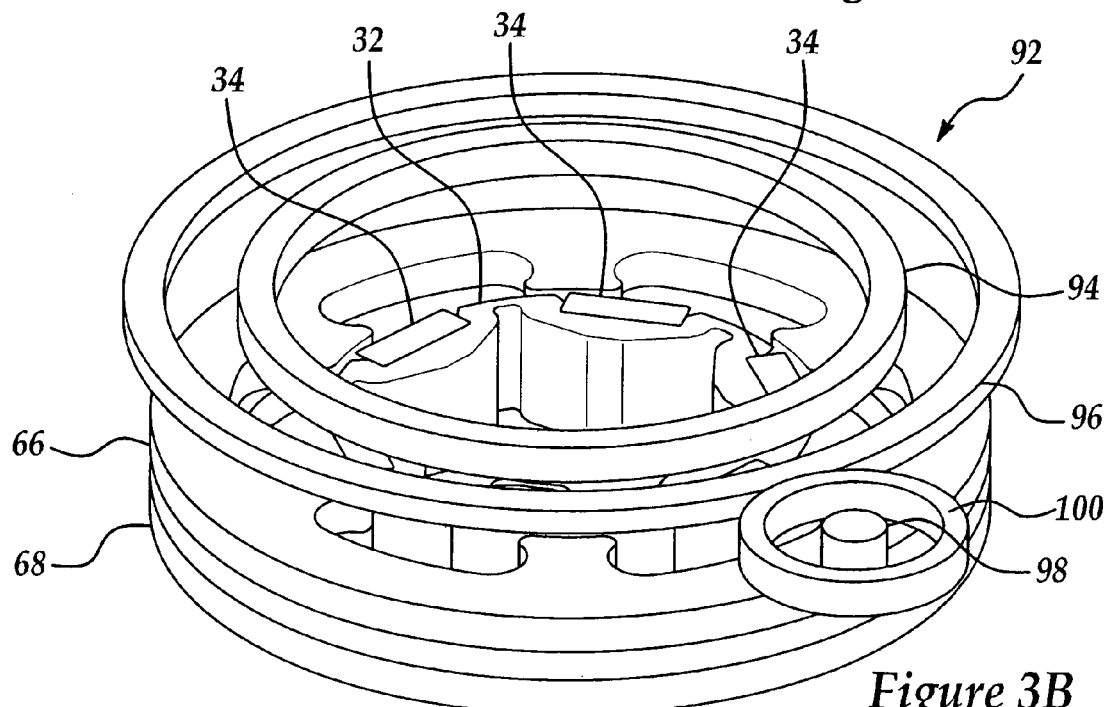
FIG. 3B is a diagrammatic illustration of a position sensor and the apparatus of FIG. 1A.
Figure 3C:
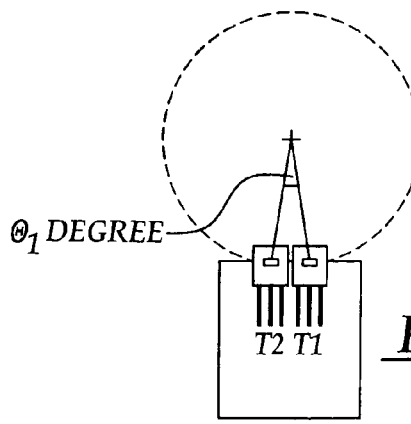
FIG. 3C is a diagrammatic illustration of a position sensor with two sensing devices, according to an embodiment of the present invention.
Figure 3D:
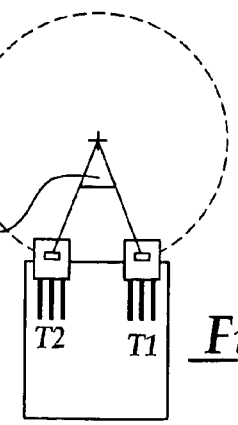
FIG. 3D is a diagrammatic illustration of a position sensor with two sensing devices, according to an embodiment of the present invention.
Figure 3E:
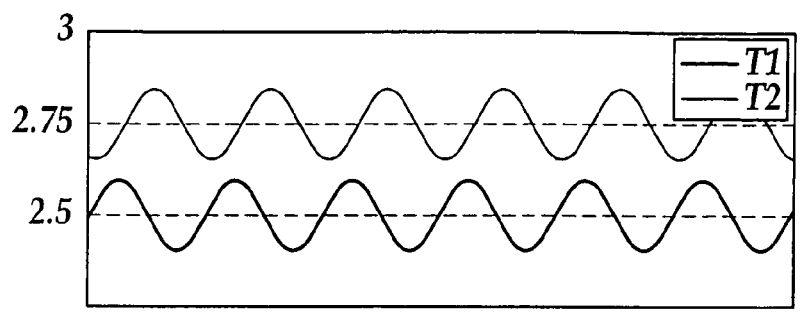
FIG. 3E is an exemplary graph illustrating operation of the position sensor of FIG. 3C.
Figure 3F:
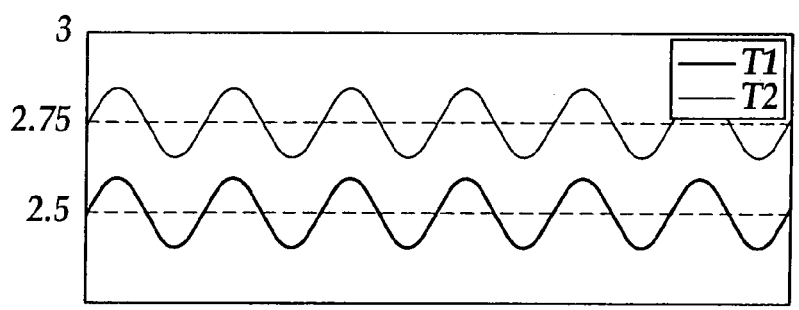
FIG. 3F is an exemplary graph illustrating operation of the position sensor of FIG. 3D.

With particular reference to FIGS. 3C, 3D, 3E, and 3F, two sensing devices 84 may be used. Any changes in magnetic flux at constant displacement between the first and second rotor assemblies 24, 26 over 360 degrees will have the same effect on each device 84. The spacing of the sensing devices 84 is dependent upon the number of magnetic poles and teeth of the first and second rotor assemblies 84, respectively. In the illustrated embodiment, there are six magnets associated with the first rotor assembly 24 and six radial teeth in each stator in the second rotor assembly 26. Due to this particular magnetic structure, at constant torque conditions, the differential flux in the measurement zone will vary over 360 degrees. This variation will cause an oscillation of the output over 360 degrees which will appear with a frequency equal to the number of magnetic poles and stator teeth located on the first and second rotor assemblies. As shown in FIG. 3C, two sensing devices 84 may be used. In the present embodiment, this oscillation will have a 6th order ripple and will be referred to as a "6 per rev". This six per rev will appear in the signal from both sensing devices 84 (T1 and T2). In this case, the T1 and T2 signals have opposite polarities. The black rectangle inside the Hall sensors 84 represents the sensitive area of the device. The output signals are proportional to the normal component of the flux passing through the sensitive area. It is desirable that the oscillation affects the T1 and T2 signals in the same manner at the same time. Because of this, the Hall sensors should be separated such that the oscillations in T1 and T2 remain in phase (since they are inverted to each other). By placing the oscillations of the T1 and T2 signals in phase, the ripple effect in the calculated torque signal is minimized. Due to mechanical packaging limitations with regard to the locations of the sensitive areas of the two Hall sensors with respect to each other, a certain phase shift exists between T1 and T2. This phase shift is shown in FIG. 3C as $\theta_1$. FIG. 3E illustrates the T1 and T2 signals over 360 degrees with no compensation. In this particular embodiment our goal is to minimize the oscillation in the calculated torque signal. By placing the two Hall probes 30 degrees apart shown as $\theta_2$ in FIG. 3D, we can put the signals in phase to minimize the output oscillation calculated in the torque measurement. FIG. 3D shows the implementation of this concept in the torque sensor. R is denoting the radial location of the Hall sensors from the axis of the shaft. FIG. 3F illustrates the T1 and T2 signals after appropriately spacing the hall probes to minimize the ripple in the calculated torque signal.

With particular reference to FIG. 3B, in another aspect of the present invention, a non-contacting position sensor 92 may be used with the apparatus 10 for sensing the relative and/or absolute position of the first shaft 12 and the second shaft 14. The position sensor 92, which is shown diagrammatically, includes a ring magnet 94 magnetized diametrically resulting in two-pole (N-S) configuration. The ring magnet 94 and the ring shield 96 are concentric with the second shaft 12 and rotate therewith. The relative sensor section can detect 0~360 degrees in either direction of rotation. A disk magnet 98 magnetized through the diameter and a ring shield 10, which are external to the ring shield 96 and fixed relative to the first shaft. The disk magnet is used to provide absolute position of the shaft since the shaft can rotate ±810 degrees. The turns counter section of the sensor rotates in steps of 180 degrees revolution of the first shaft or the relative sensor section and connected there by Geneva wheel gear mechanism. In both sensor section there are two Hall sensors placed at quadrature. They both use sine and cosine signals to extract position information.

The teeth 66D, 68D may have different shapes. Various examples of teeth 66D, 68D are shown in FIGS. 8A, 8B, 8C, 8D. However, it should be noted that the present invention is not limited to any one shape of the teeth 66D, 68D.

As discussed above, the teeth 66D, 68D may be in phase or out of phase. If the teeth 66D, 68D are in-phase or aligned, a centerline 104 of the teeth 66D of the first stator plate 66 is aligned with a centerline 104 of the teeth 68D of the second stator plate 68. If the teeth 66D, 68D are out-of phase, than the centerline 104 of the teeth 66D of the first stator plate 66 are offset from the centerline 104 of the teeth 68D of the second stator plate 68, as shown in FIGS. 3A and 4.

If the teeth 66D, 68D are out-of-phase, there may be a radial gap between edges of the teeth 66D, 68D as shown best in FIG. 4, the edges of the teeth 66D, 68D may be aligned, or the teeth 66D, 68D may at least partially overlap.

Figure 8A:
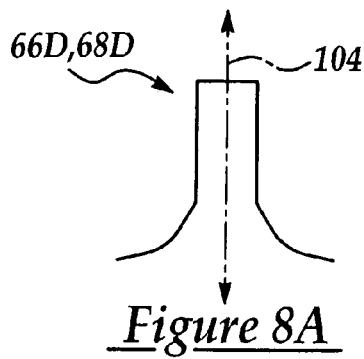
FIG. 8A is an illustration of a tooth of the second rotor assembly according to an embodiment of the present invention.
Figure 8B:
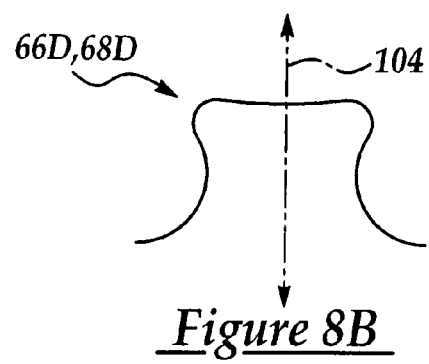
FIG. 8B is an illustration of a tooth of the second rotor assembly according to another embodiment of the present invention.
Figure 8C:
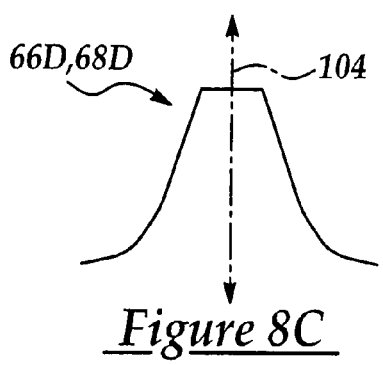
FIG. 8C is an illustration of a tooth of the second rotor assembly according to a further embodiment of the present invention.
Figure 8D:
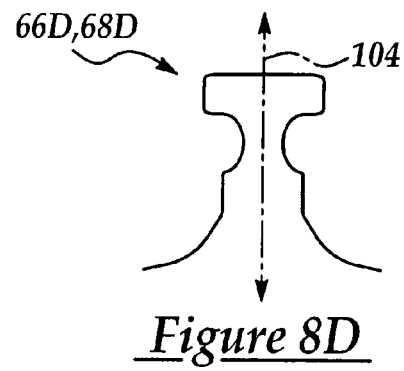
FIG. 8D is an illustration of a tooth of the second rotor assembly according to still another embodiment of the present invention.
Figure 11D:
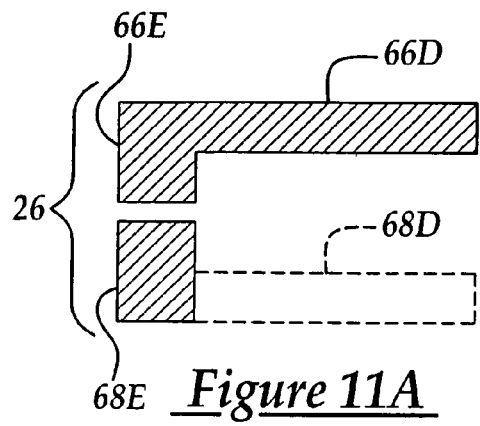
FIG. 11D is a top view of the second rotor assembly of FIG. 11A.
Figure 11D:
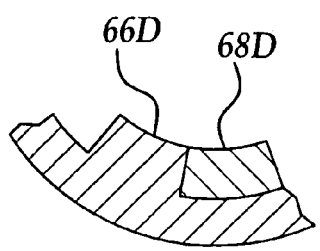
Figure 11D:
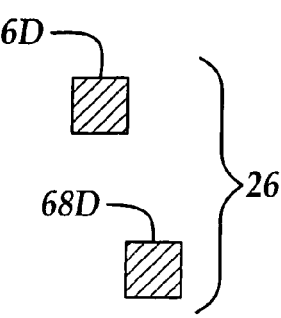
Figure 11D:
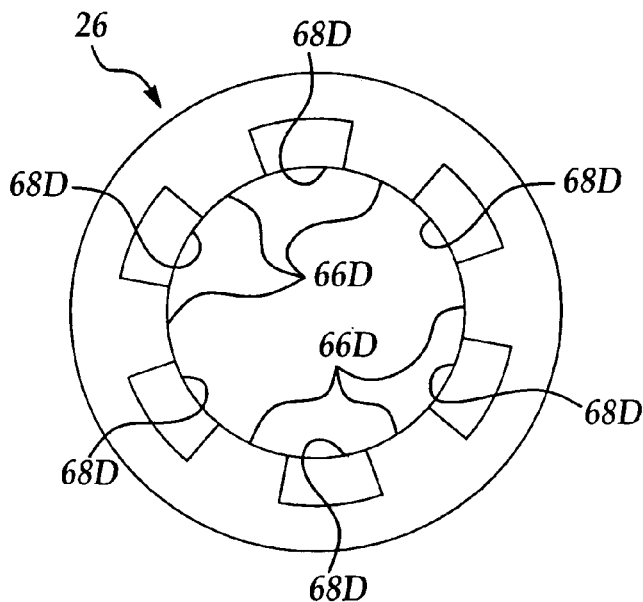
Figure 11E:
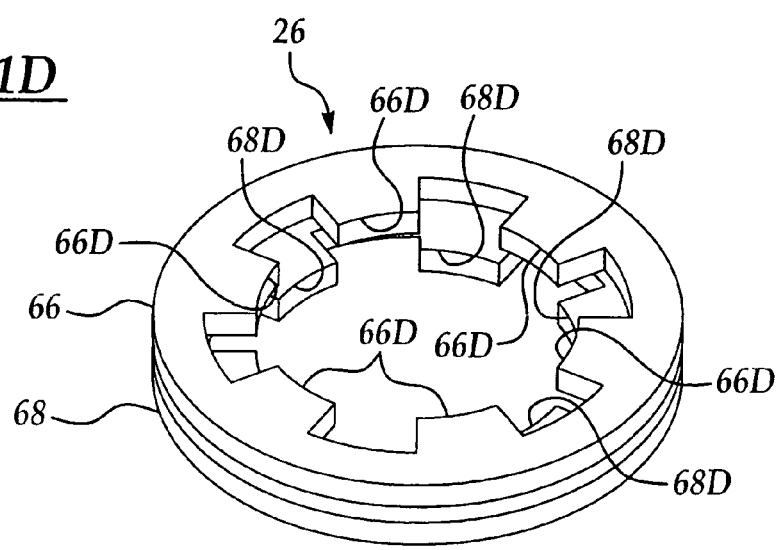
FIG. 11E is a three dimensional view of the second rotor assembly of FIG. 11A.

For example, in one embodiment the edges of the teeth 66D, 68D of one of the first and second stator plates 66, 68 are adjacent with an edge of one of the teeth 66D, 68D of the other of the first and second plates 66, 68. The shape of the teeth 66D, 68D is shown in FIG. 8C and the relationship between the teeth 66D, 68D is shown in FIGS. 11D and 11E.

In another embodiment, at least a portion of the edge of one of the teeth 66D, 68D of one of the first and second plates and at least a portion of the edge of one of the teeth 66D, 68D of the other of the first and second plates 66, 68 overlap.

With particular reference to FIGS. 9A, 9B, 9C, 10B, 10C, 11A, 11B, and 11C, and 13–50 various, configurations of the second rotor assembly 26 are shown using simple diagrammatic illustrations. Similar parts are numbered the same.

With reference to FIGS. 9A, 9B, 9C, 10A, 10B, 10C, 11A, 11B, and 11C, in another aspect of the present invention the first and second plates 66, 68 include axial members 66E, 68E which extend in opposite direction from the circular base 66C 68D of the first and second stator plates 66, 68, respectively to form the gap 70. In one embodiment, the axial members 66E, 68E extend around the circumference of the circular base 66C, 68D of each stator plate 66, 68.

Figure 9A:
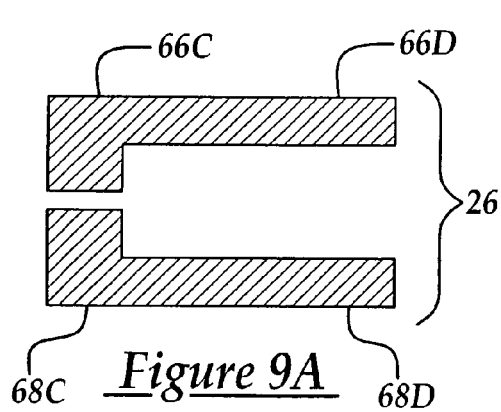
FIG. 9A is a diagrammatic illustration of a cut away view of a second rotor assembly of the apparatus of FIG. 1A, according to a first embodiment of the present invention.
Figure 9B:
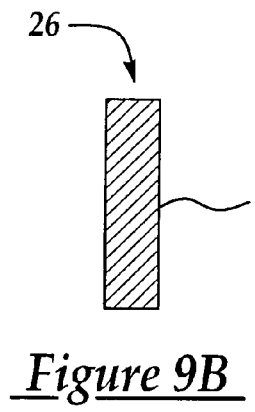
FIG. 9B is a top view of a portion of the second rotor assembly of FIG. 9A.
Figure 9C:
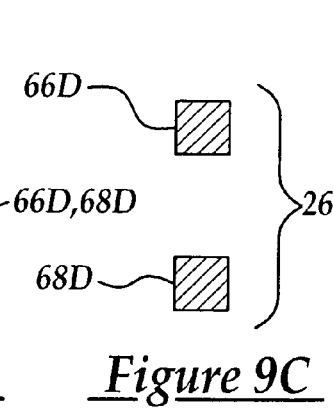
FIG. 9C is a front view of the second rotor assembly of FIG. 9A.

With particular reference to FIGS. 9A, 9B, 9C, the teeth 66D, 68D in-phase. FIG. 9A shows a cross-section view of the teeth 66D, 68D. FIG. 9B shows a top-down view of the teeth 66D, 68D. FIG. 9C shows a front view of the teeth 66D, 68D (from the first rotor assembly 24).

Figure 10A:
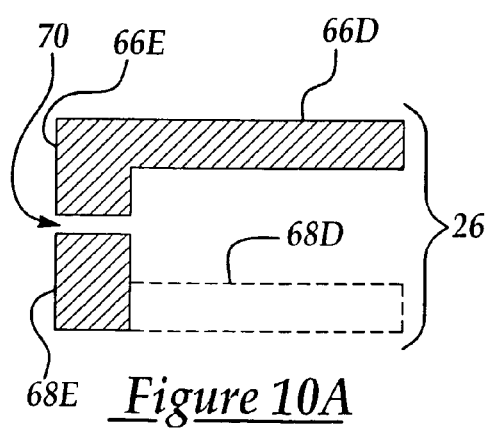
FIG. 10A is a diagrammatic illustration of a cut away view of a second rotor assembly of the apparatus of FIG. 1A, according to a second embodiment of the present invention.
Figure 10B:
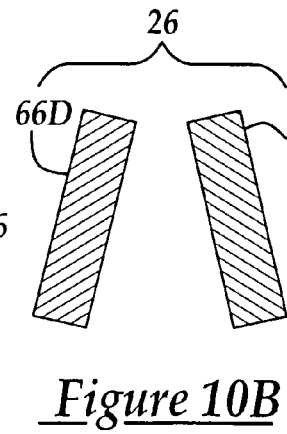
FIG. 10B is a top view of a portion of the second rotor assembly of FIG. 10A.
Figure 10C:
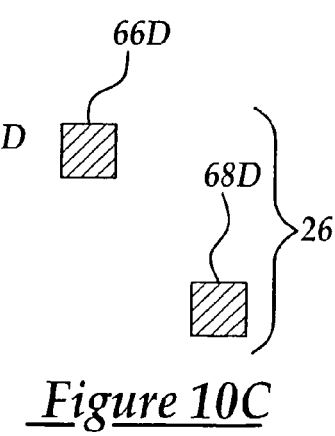
FIG. 10C is a front view of the second rotor assembly of FIG. 10A.

With particular reference to FIGS. 10A, 10B, 10C, the teeth 66D, 68D are out of phase with a gap. FIG. 10A shows a cross-section view of the teeth 66D, 68D. FIG. 10B shows a top-down view of the teeth 66D, 68D. FIG. 10C shows a front view of the teeth 66D, 68D (from the first rotor assembly 24).

With particular reference to FIGS. 11A, 11B, 11C, the teeth 66D, 68D are out-of-phase and have the shape as shown in 8C. In this embodiment, the edges of the teeth 66D, 68D are radially adjacent (see above and FIGS. 11D and 11E). FIG. 11A shows a cross-section view of the teeth 66D, 68D. FIG. 11B shows a top-down view of the teeth 66D, 68D. FIG. 11C shows a front view of the teeth 66D, 68D (from the first rotor assembly 24).

FIG. 13 shows an apparatus 10 with a first rotor assembly 24 which a plurality of unipolar magnet 34 in first and second rows 50, 52 and a second rotor assembly 26 with first and second stator plates 66, 68. The first and second stator plates 66, 68 are planar and in phase.

FIG. 14 shows an apparatus 10 with a first rotor assembly 24 which a plurality of unipolar magnet 34 in first and second rows 50, 52 and a second rotor assembly 26 with first and second stator plates 66, 68 with axial members 66E, 68E. The first and second stator plates 66, 68 are in phase.

Figure 15:
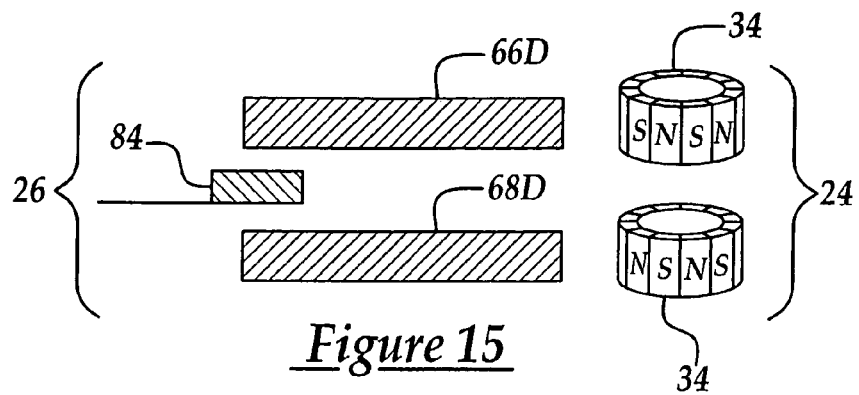
FIG. 15 is a diagrammatic illustration of a cross-sectional view of the apparatus of FIG. 1A, according to a third embodiment of the present invention.

FIG. 15 shows an apparatus 10 with a first rotor assembly 24 with two ring magnets 34 and a second rotor assembly 26 with first and second stator plates 66, 68 which are planar. The first and second stator plates 66, 68 are in phase.

Figure 16:
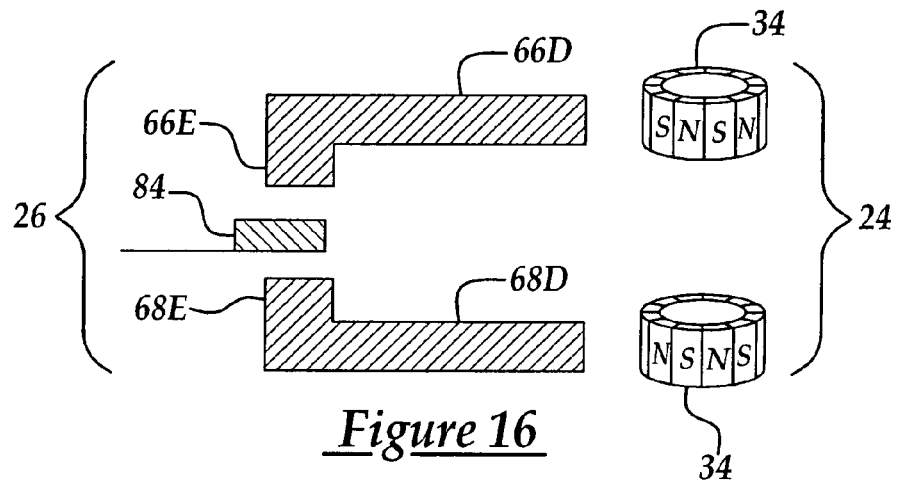
FIG. 16 is a diagrammatic illustration of a cross-sectional view of the apparatus of FIG. 1A, according to a fourth embodiment of the present invention.

FIG. 16 shows an apparatus 10 with a first rotor assembly 24 with two ring magnets 34 and a second rotor assembly 26 with first and second stator plates 66, 68. Each stator plate 66, 68 includes an axial member 66E, 68E. The first and second stator plates 66, 68 are in phase.

Figure 17:
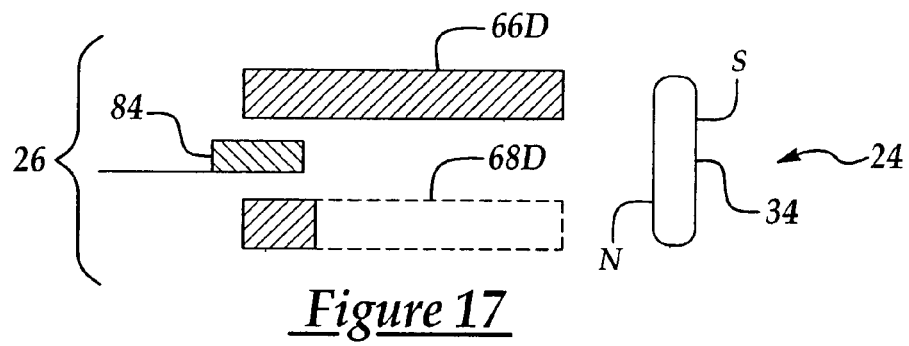
FIG. 17 is a diagrammatic illustration of a cross-sectional view of the apparatus of FIG. 1A, according to a fifth embodiment of the present invention.

FIG. 17 shows an apparatus 10 with a first rotor assembly 24 with a row of unipolar magnets 34 and a second rotor assembly 26 with first and second stator plates 66, 68. The first and second rotor plates 66, 68 are planar.

Figure 18:
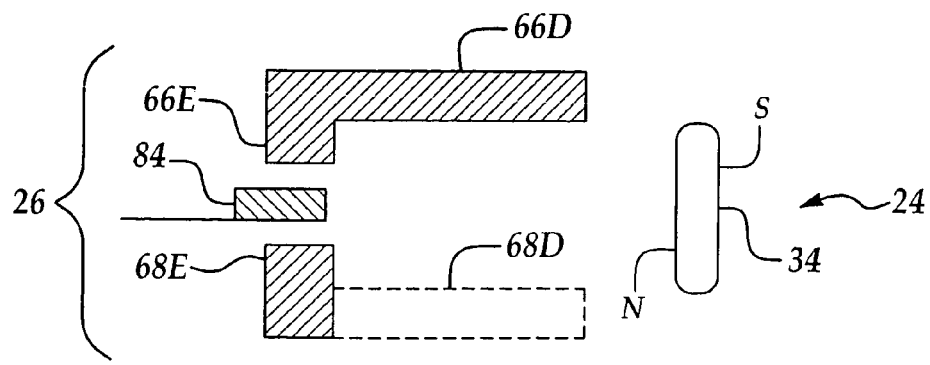
FIG. 18 is a diagrammatic illustration of a cross-sectional view of the apparatus of FIG. 1A, according to a sixth embodiment of the present invention.

FIG. 18 shows an apparatus 10 with a first rotor assembly 24 with a row of unipolar magnets 34 and a second rotor assembly 26 with first and second stator plates 66, 68. The first and second stator plates 66, 68 include an axial member 66E, 68E. The first and second rotor plates 66, 68 are out of phase.

Figure 19:
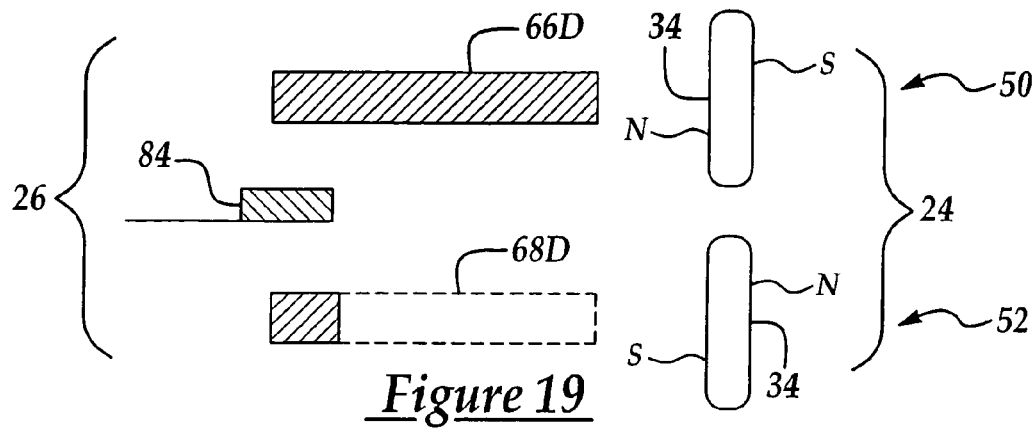
FIG. 19 is a diagrammatic illustration of a cross-sectional view of the apparatus of FIG. 1A, according to a seventh embodiment of the present invention.

FIG. 19 shows an apparatus 10 with a first rotor assembly 24 with first and second rows 50, 52 of unipolar magnets 34 and a second rotor assembly 26 with first and second stator plates 66, 68. The first and second stator plates 66, 68 are out of phase.

Figure 20:
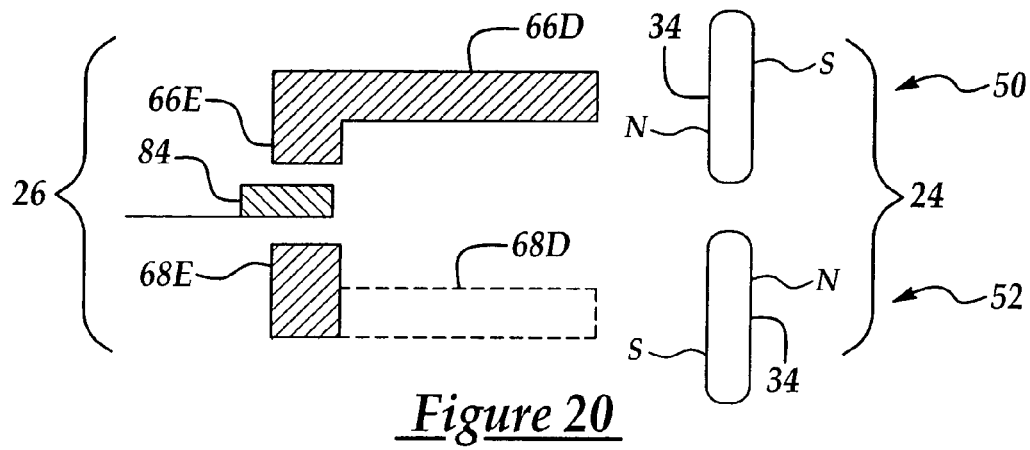
FIG. 20 is a diagrammatic illustration of a cross-sectional view of the apparatus of FIG. 1A, according to an eighth embodiment of the present invention.

FIG. 20 shows an apparatus 10 with a first rotor assembly 24 with first and second rows 50, 52 of unipolar magnets 34 and a second rotor assembly 26 with first and second stator plates 66, 68. The first and second stator plates 66, 68 are out of phase and include an axial member 66E, 68E.

Figure 21:
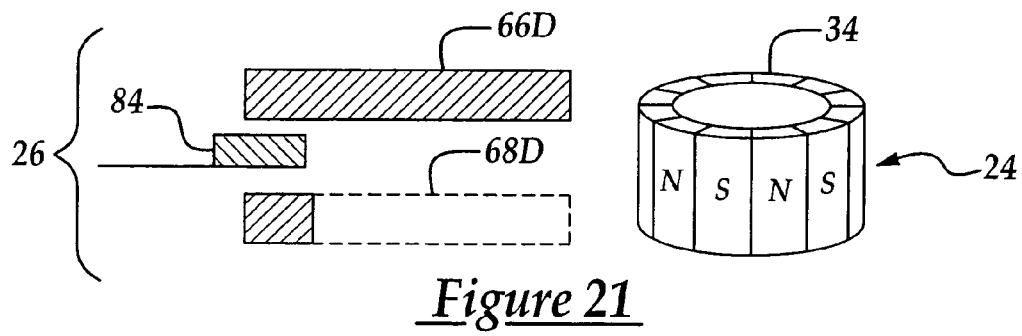
FIG. 21 is a diagrammatic illustration of a cross-sectional view of the apparatus of FIG. 1A, according to a ninth embodiment of the present invention.

FIG. 21 shows an apparatus 10 with a first rotor assembly 24 with a ring magnet 34 and a second rotor assembly 26 with first and second stator plates 66, 68. The first and second stator plates are out of phase and planar.

Figure 22:
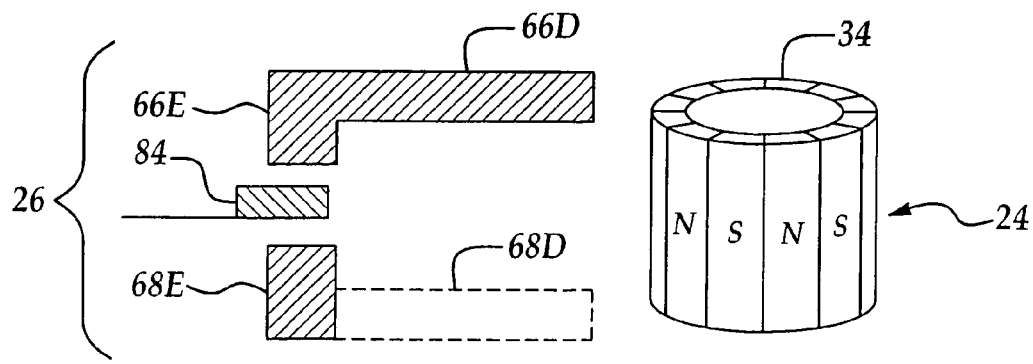
FIG. 22 is a diagrammatic illustration of a cross-sectional view of the apparatus of FIG. 1A, according to a tenth embodiment of the present invention.

FIG. 22 shows an apparatus 10 with a first rotor assembly 24 with a ring magnet 34 and a second rotor assembly with first and second stator plates 66, 68. The first and second stator plates are out of phase and include an axial member 66E, 68E.

Figure 23:
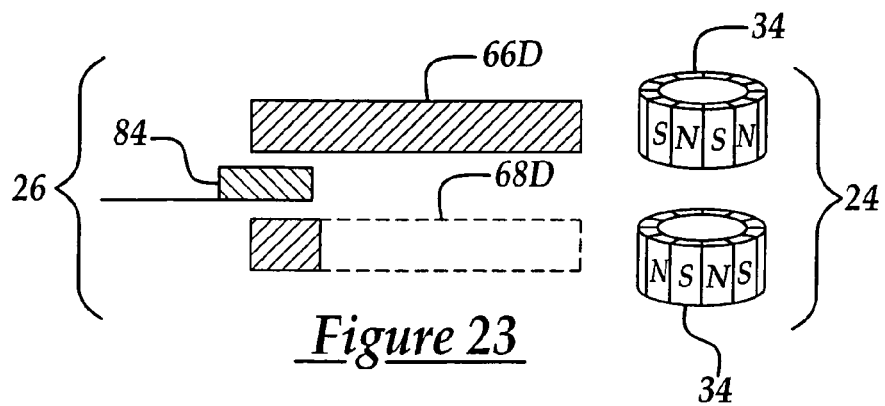
FIG. 23 is a diagrammatic illustration of a cross-sectional view of the apparatus of FIG. 1A, according to an eleventh embodiment of the present invention.

FIG. 23 shows an apparatus 10 with a first rotor assembly 24 with two ring magnets 34 and a second rotor assembly 26 with first and second stator plates 66, 68. The first and second stator plates 66, 68 are out of phase and planar.

Figure 24:
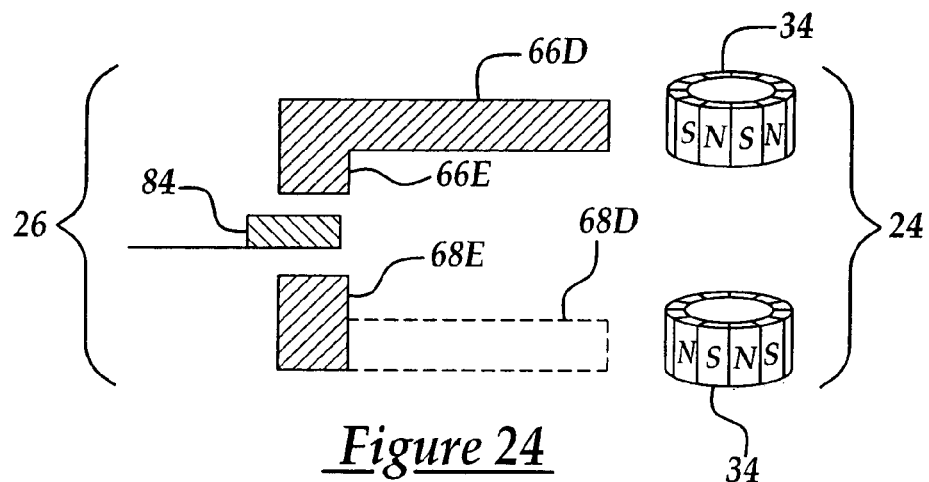
FIG. 24 is a diagrammatic illustration of a cross-sectional view of the apparatus of FIG. 1A, according to a twelfth embodiment of the present invention.

FIG. 24 shows an apparatus 10 with a first rotor assembly 24 with two ring magnets 34 and a second rotor assembly 26 with first and second stator plates 66, 68. The first and second stator plates 66, 68 are out of phase and include an axial member 66E, 68E.

With reference to FIG. 25-32 in another aspect of the present invention, the first and second stator plates 66, 68 may include axially extending teeth 66F, 68F. The axially extending teeth 66F, 68F may be interleaved or non-interleaved.

Figure 25:
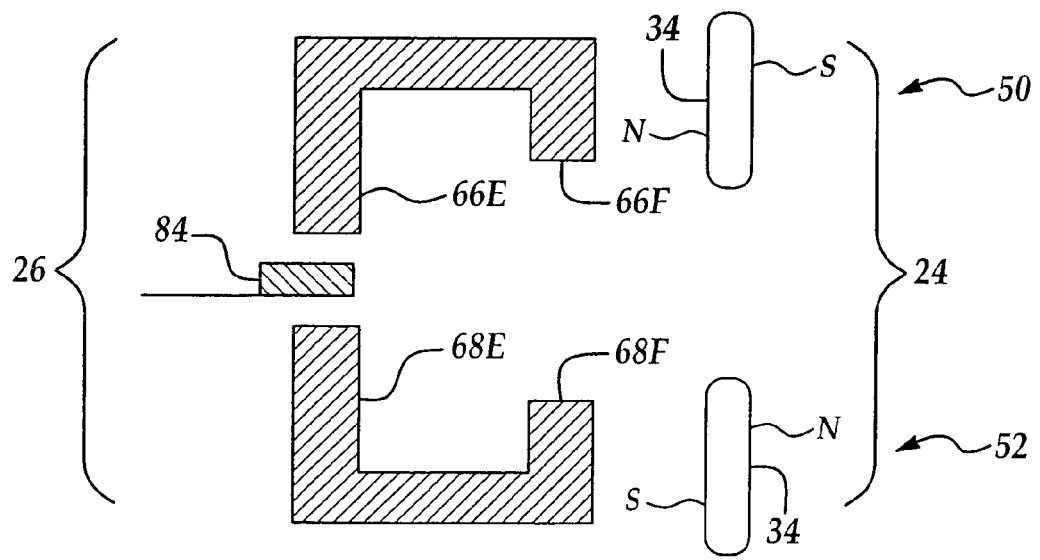
FIG. 25 is a diagrammatic illustration of a cross-sectional view of the apparatus of FIG. 1A, according to a thirteenth embodiment of the present invention.

FIG. 25 shows an apparatus 10 with a first rotor assembly 24 with a plurality of unipolar magnets 34 arranged in first and second rows 50, 52 and a second rotor assembly 26 with first and second stator plates 66, 68. The first and second stator plates 66, 68 are in phase. Each stator plate 66, 68 includes an axially extending member 66E, 68E and a plurality of axially extending teeth 66F, 68F. The axially extending teeth 66F, 68F are non interleaving.

Figure 26:
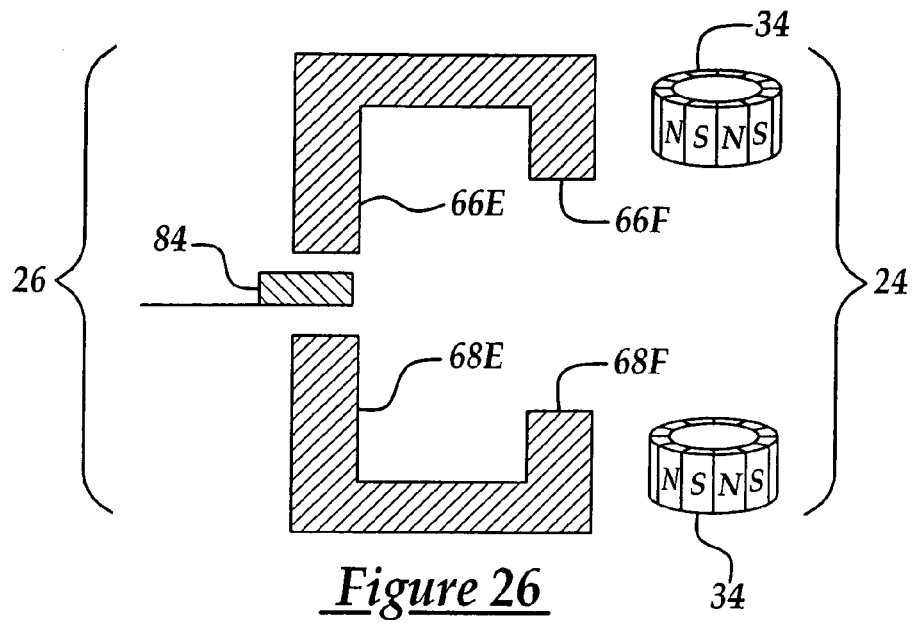
FIG. 26 is a diagrammatic illustration of a cross-sectional view of the apparatus of FIG. 1A, according to a fourteenth embodiment of the present invention.

FIG. 26 shows an apparatus 10 with a first rotor assembly 24 with two ring magnets 34 and a second rotor assembly 26 with first and second stator plates 66, 68. The first and second stator plates 66, 68 are in phase. Each stator plate 66, 68 includes an axially extending member 66E, 68E and a plurality of axially extending teeth 66F, 68F. The axially extending teeth 66F, 68F are non interleaving.

Figure 27:
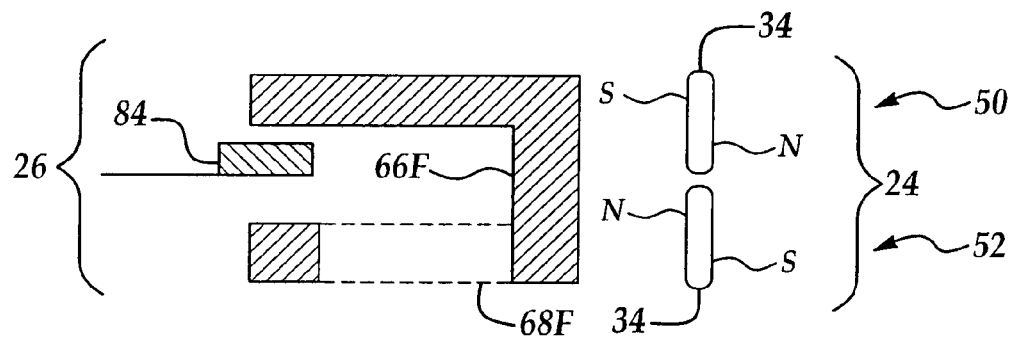
FIG. 27 is a diagrammatic illustration of a cross-sectional view of the apparatus of FIG. 1A, according to a fifteenth embodiment of the present invention.

FIG. 27 shows an apparatus 10 with a first rotor assembly 24 with a plurality of unipolar magnets 34 arranged in first and second rows 50, 52 and a second rotor assembly 26 with first and second stator plates 66, 68. The first and second stator plates 66, 68 are out of phase. The first and second stator plates 66, 68 are planar and include a plurality of axially extending teeth 66F, 68F. The axially extending teeth 66F, 68F are interleaving. Alternatively, a single row of magnets 34 may be provided.

Figure 28:
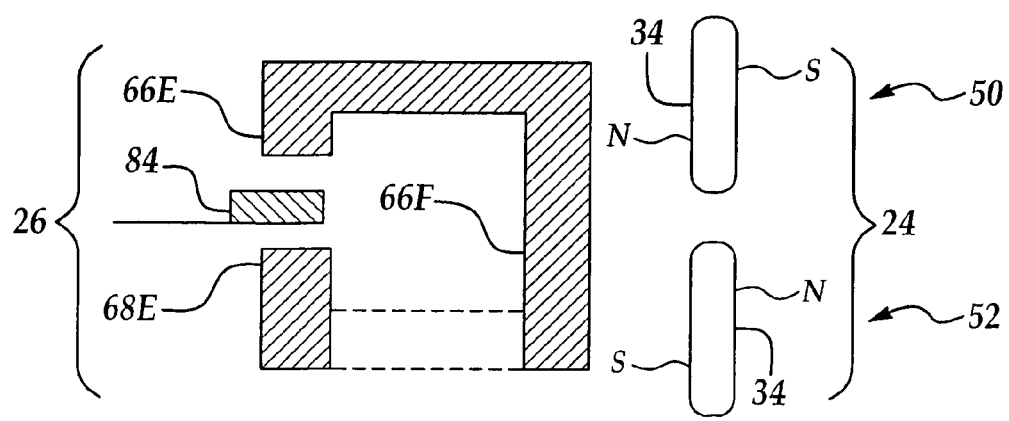
FIG. 28 is a diagrammatic illustration of a cross-sectional view of the apparatus of FIG. 1A, according to a sixteenth embodiment of the present invention.

FIG. 28 shows an apparatus 10 with a first rotor assembly 24 with a plurality of unipolar magnets 34 arranged in first and second rows 50, 52 and a second rotor assembly 26 with first and second stator plates 66, 68. The first and second stator plates 66, 68 are out of phase. Each stator plate 66, 68 includes an axially extending member 66E, 68E and a plurality of axially extending teeth 66F, 68F. The axially extending teeth 66F, 68F are interleaving. Alternatively, a single row of magnets 34 may be provided.

Figure 29:
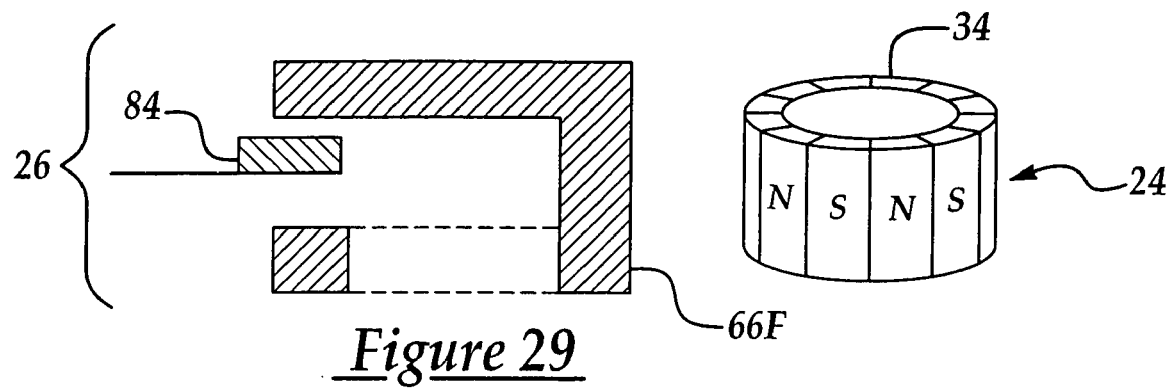
FIG. 29 is a diagrammatic illustration of a cross-sectional view of the apparatus of FIG. 1A, according to a seventeenth embodiment of the present invention.

FIG. 29 shows an apparatus 10 with a first rotor assembly 24 with a ring magnet 34 and a second rotor assembly 26 with first and second stator plates 66, 68. The first and second stator plates 66, 68 are out of phase. The stator plates 66, 68 include a plurality of axially extending teeth 66F, 68F. The axially extending teeth 66F, 68F are interleaving.

Figure 30:
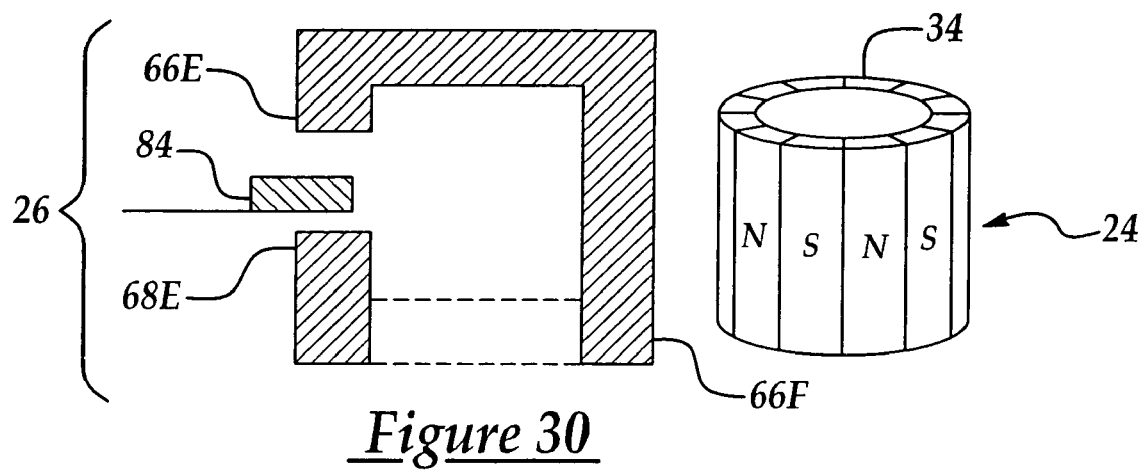
FIG. 30 is a diagrammatic illustration of a cross-sectional view of the apparatus of FIG. 1A, according to an eighteenth embodiment of the present invention.

FIG. 30 shows an apparatus 10 with a first rotor assembly 24 with a ring magnet 34 and a second rotor assembly 26 with first and second stator plates 66, 68. The first and second stator plates 66, 68 are out of phase. Each stator plate 66, 68 includes an axially extending member 66E, 68E and a plurality of axially extending teeth 66F, 68F. The axially extending teeth 66F, 68F are interleaving.

Figure 31:
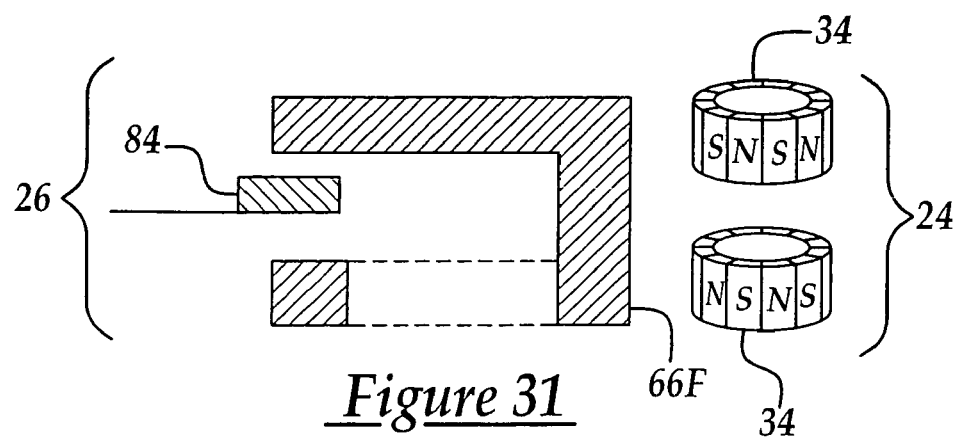
FIG. 31 is a diagrammatic illustration of a cross-sectional view of the apparatus of FIG. 1A, according to a nineteenth embodiment of the present invention.

FIG. 31 shows an apparatus 10 with a first rotor assembly 24 with first and second ring magnets 34 and a second rotor assembly 26 with first and second stator plates 66, 68. The stator plates 66, 68 are out of phase and include a plurality of axial extending teeth 66F, 68F. The axial extending teeth 66F, 68F are interleaving.

Figure 32:
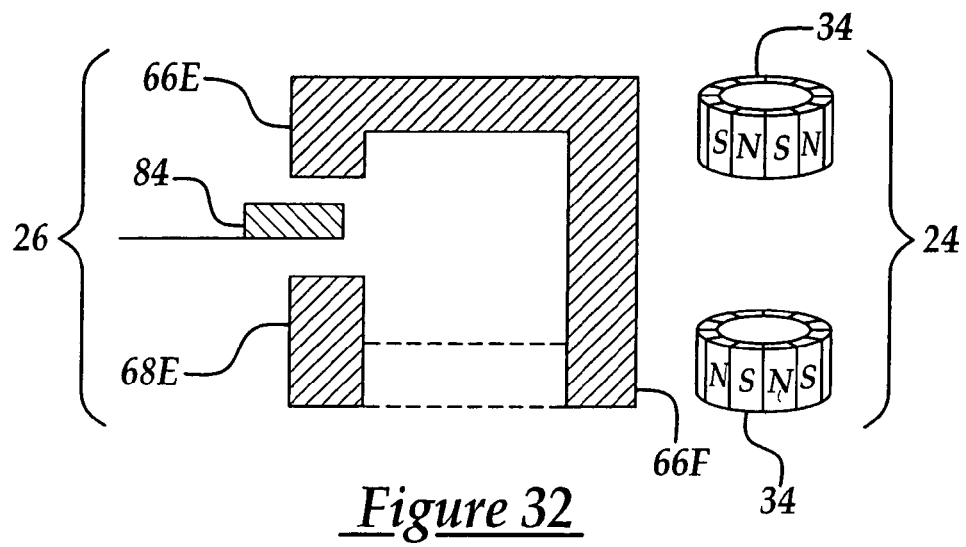
FIG. 32 is a diagrammatic illustration of a cross-sectional view of the apparatus of FIG. 1A, according to a twentieth embodiment of the present invention.
Figure 33:
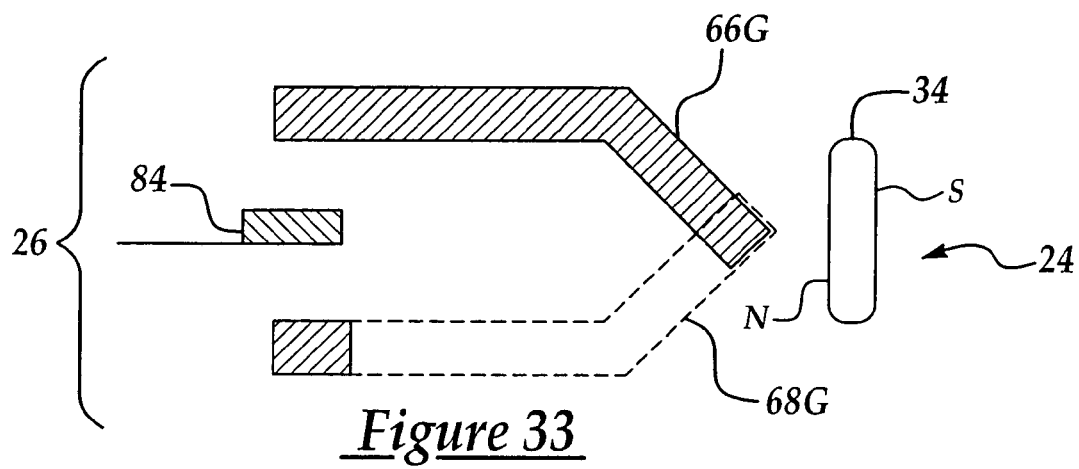
FIG. 33 is a diagrammatic illustration of a cross-sectional view of the apparatus of FIG. 1A, according to a twenty-first embodiment of the present invention.
Figure 34:
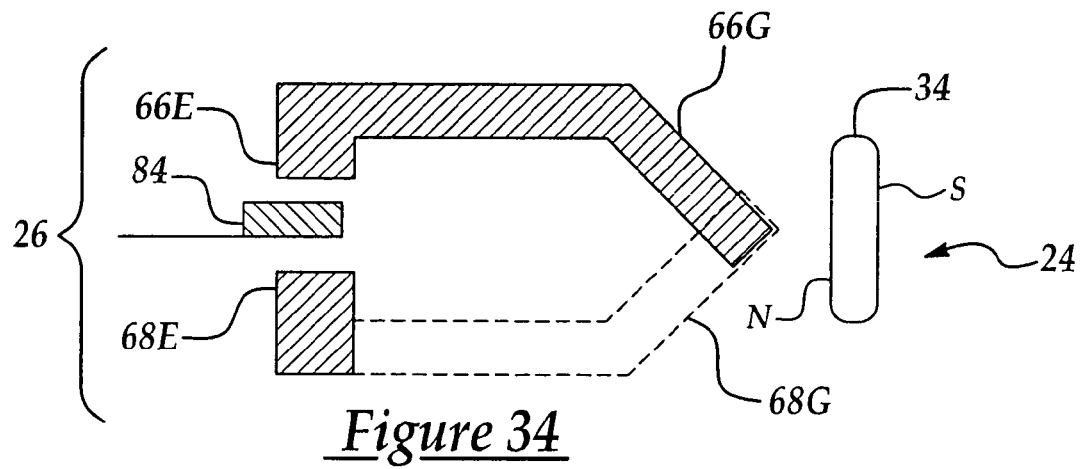
FIG. 34 is a diagrammatic illustration of a cross-sectional view of the apparatus of FIG. 1A, according to a twenty-second embodiment of the present invention.
Figure 35:
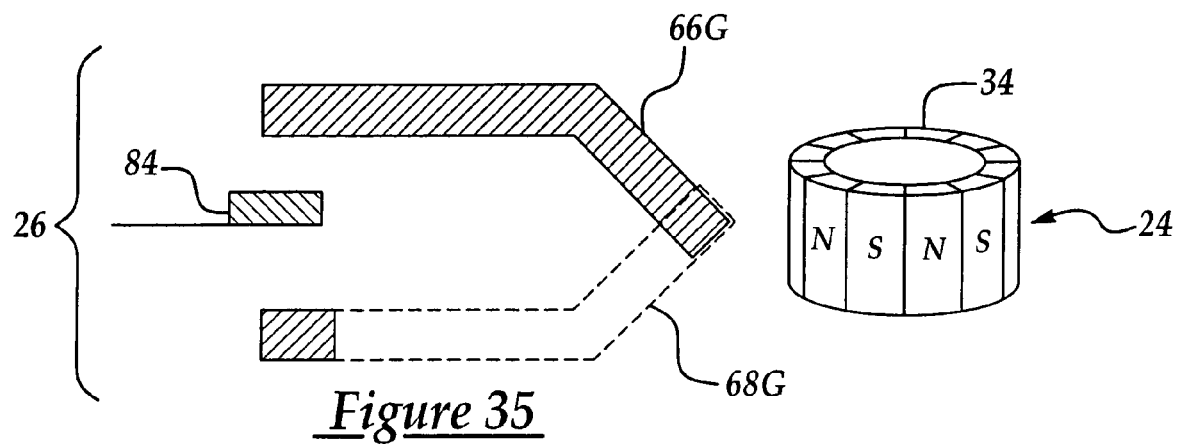
FIG. 35 is a diagrammatic illustration of a cross-sectional view of the apparatus of FIG. 1A, according to a twenty-third embodiment of the present invention.
Figure 36:
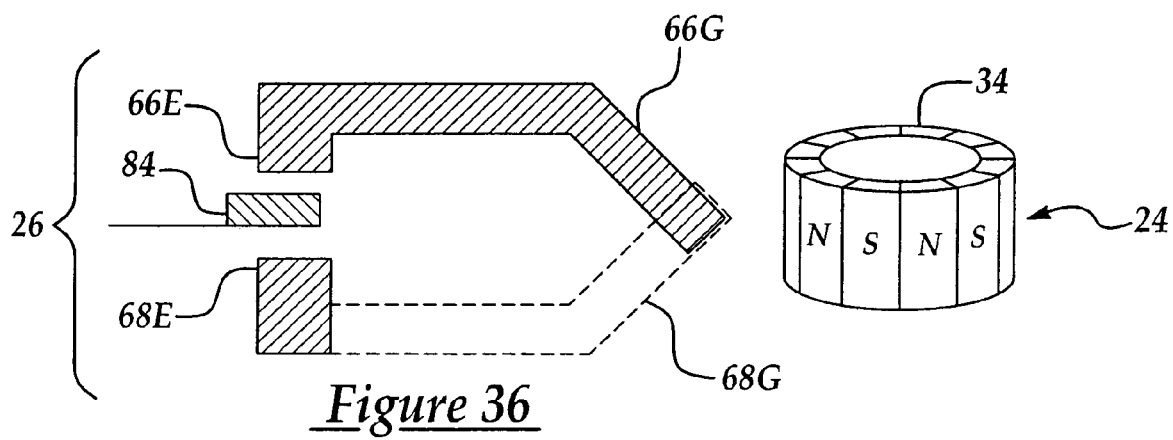
FIG. 36 is a diagrammatic illustration of a cross-sectional view of the apparatus of FIG. 1A, according to a twenty-fourth embodiment of the present invention.
Figure 37:
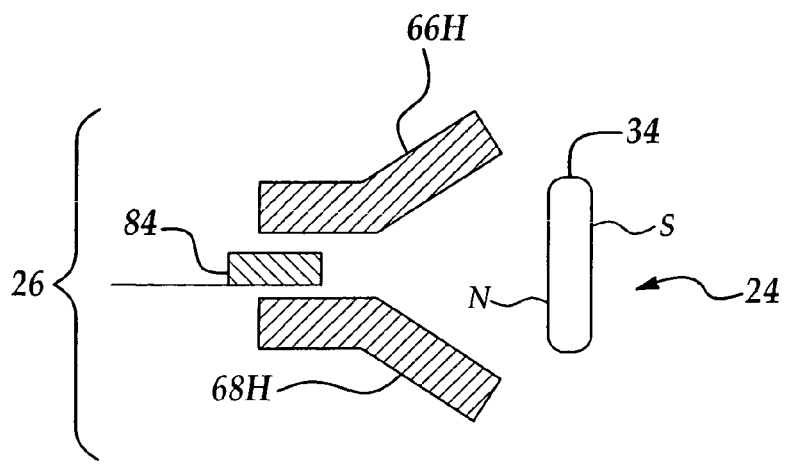
FIG. 37 is a diagrammatic illustration of a cross-sectional view of the apparatus of FIG. 1A, according to a twenty-fifth embodiment of the present invention.
Figure 38:
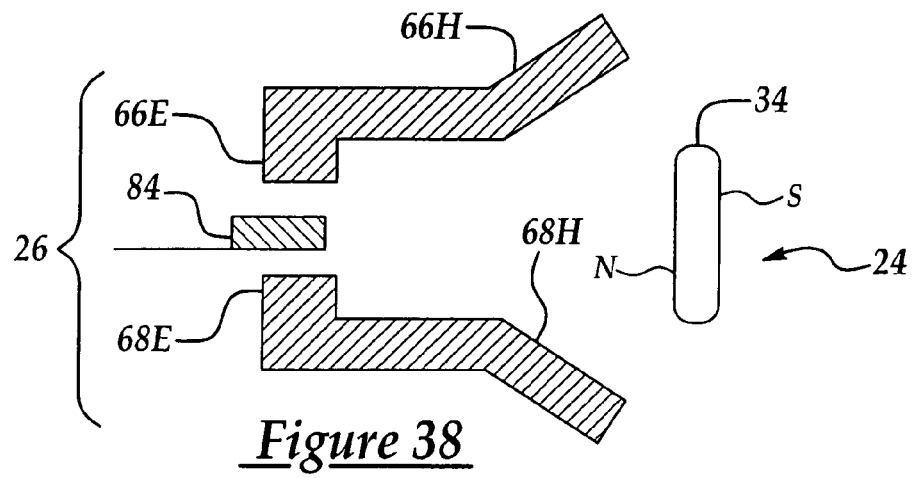
FIG. 38 is a diagrammatic illustration of a cross-sectional view of the apparatus of FIG. 1A, according to a twenty-sixth embodiment of the present invention.
Figure 39:
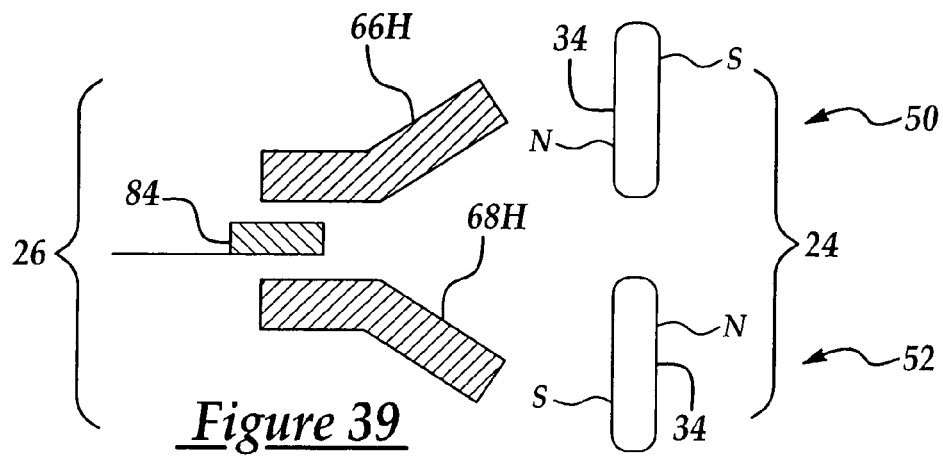
FIG. 39 is a diagrammatic illustration of a cross-sectional view of the apparatus of FIG. 1A, according to a twenty-seventh embodiment of the present invention.
Figure 40:
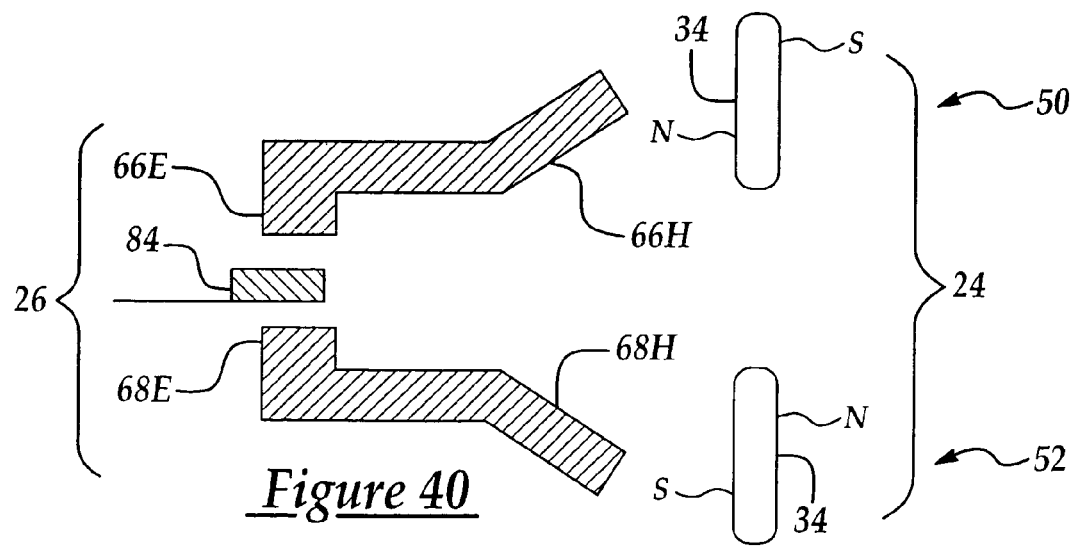
FIG. 40 is a diagrammatic illustration of a cross-sectional view of the apparatus of FIG. 1A, according to a twenty-eighth embodiment of the present invention.
Figure 44:
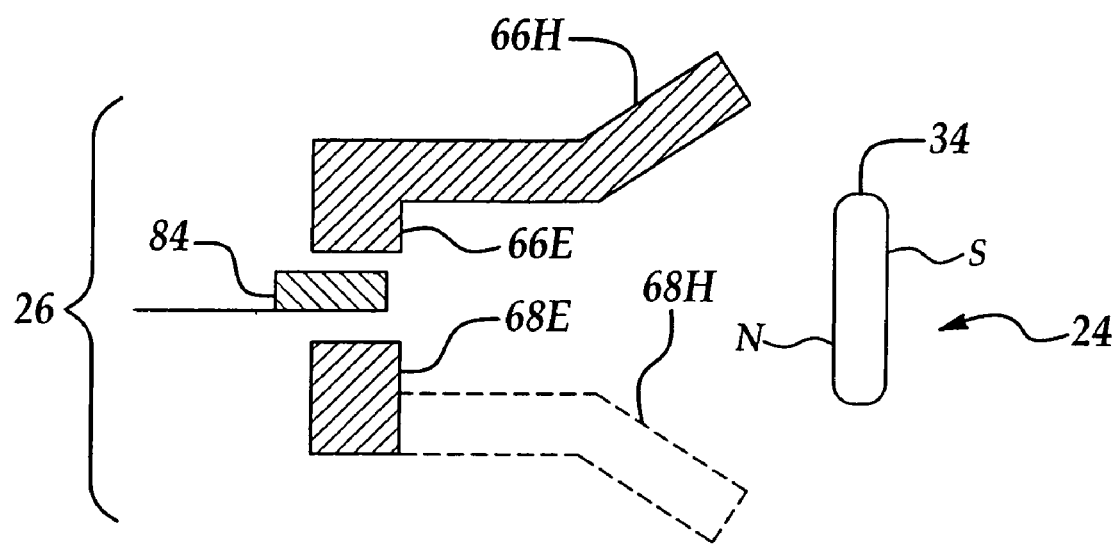
FIG. 44 is a diagrammatic illustration of a cross-sectional view of the apparatus of FIG. 1A, according to a thirty-second embodiment of the present invention.
Figure 45:
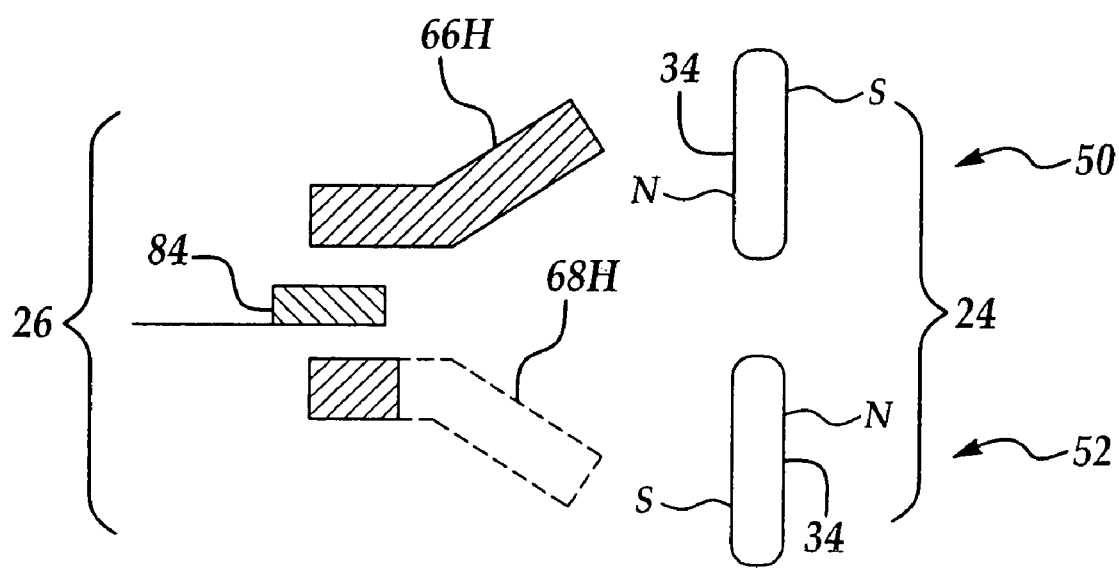
FIG. 45 is a diagrammatic illustration of a cross-sectional view of the apparatus of FIG. 1A, according to a thirty-third embodiment of the present invention.
Figure 46:
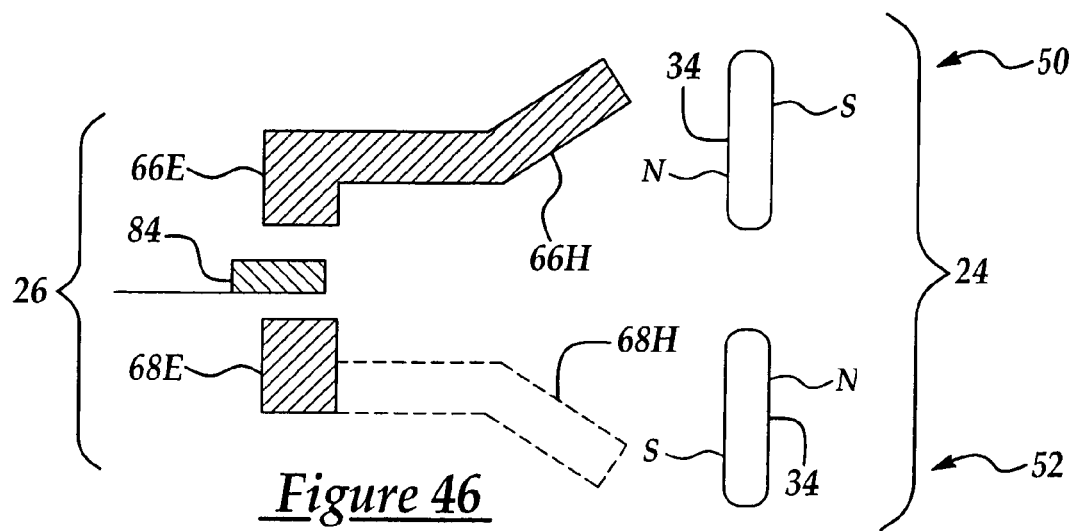
FIG. 46 is a diagrammatic illustration of a cross-sectional view of the apparatus of FIG. 1A, according to a thirty-fourth embodiment of the present invention.
Figure 47:
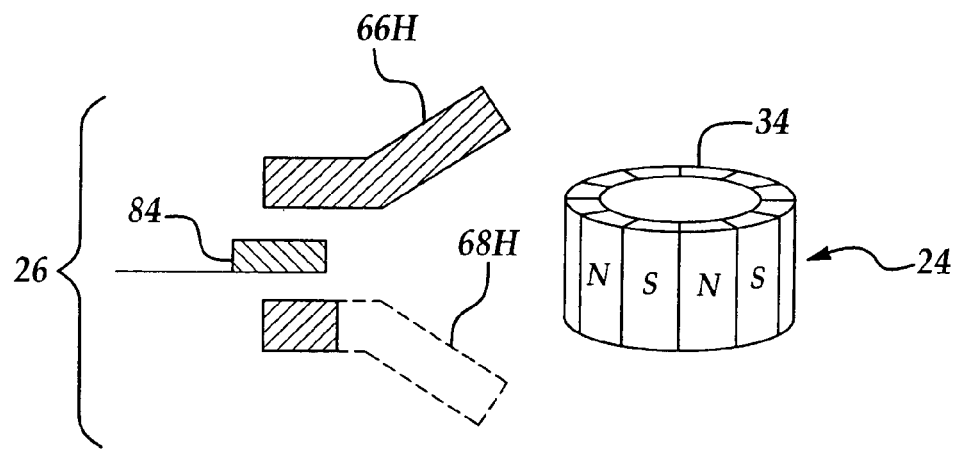
FIG. 47 is a diagrammatic illustration of a cross-sectional view of the apparatus of FIG. 1A, according to a thirty-fifth embodiment of the present invention.
Figure 48:
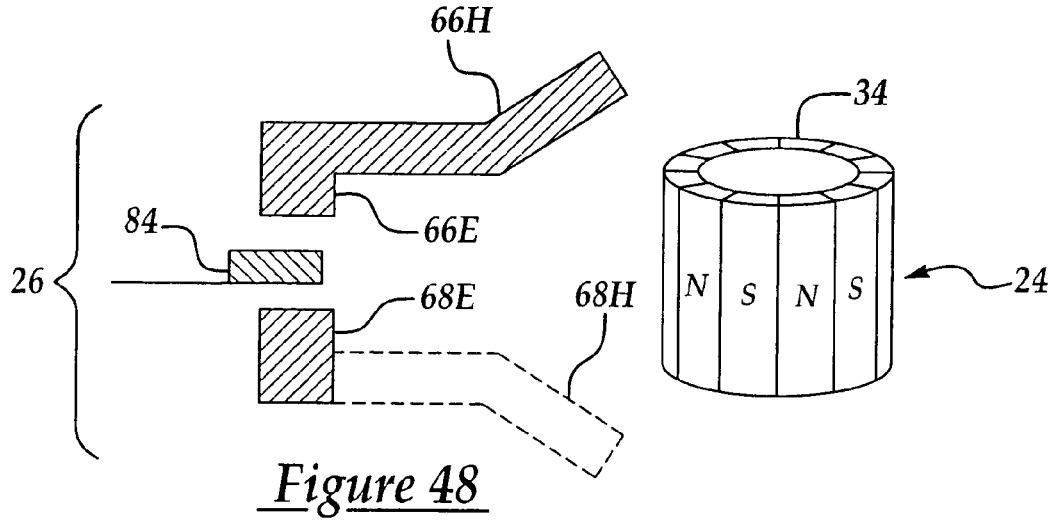
FIG. 48 is a diagrammatic illustration of a cross-sectional view of the apparatus of FIG. 1A, according to a thirty-sixth embodiment of the present invention.
Figure 49:
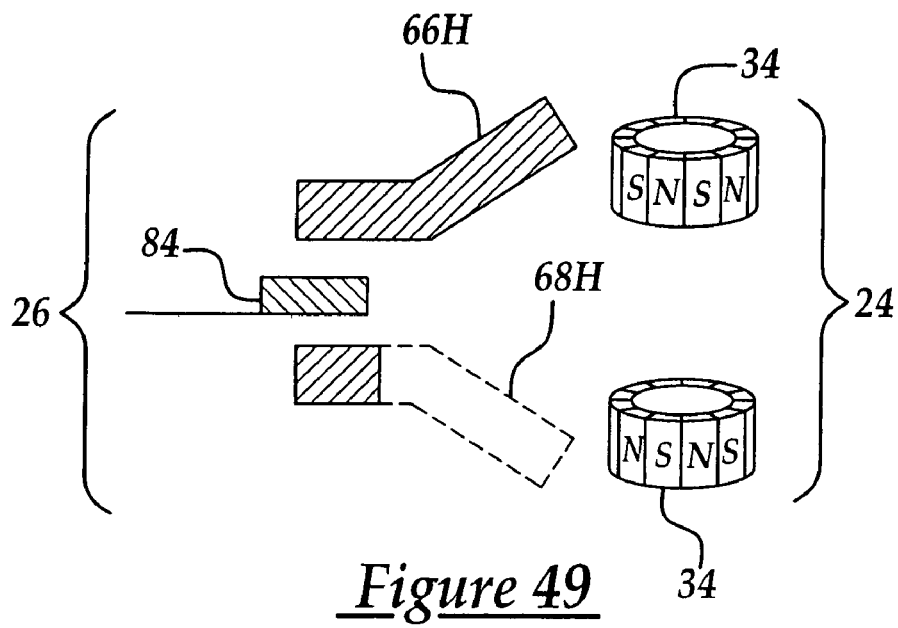
FIG. 49 is a diagrammatic illustration of a cross-sectional view of the apparatus of FIG. 1A, according to a thirty-seventh embodiment of the present invention.
Figure 50:
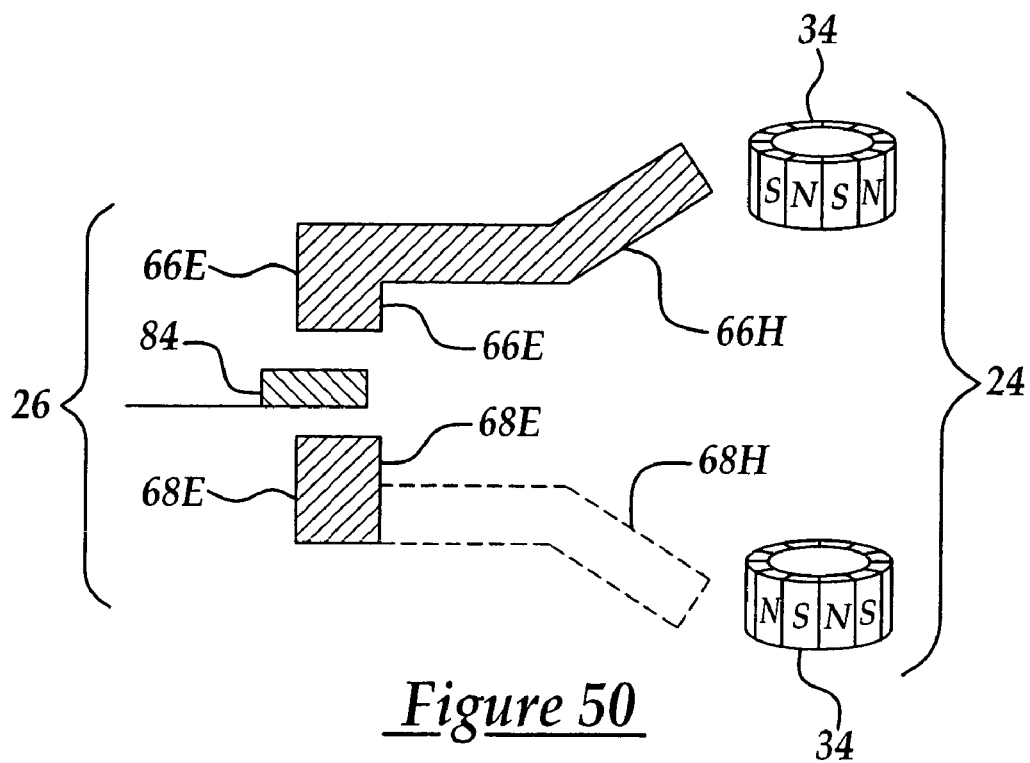
FIG. 50 is a diagrammatic illustration of a cross-sectional view of the apparatus of FIG. 1A, according to a thirty-eighth embodiment of the present invention.

FIG. 32 shows an apparatus 10 with a first rotor assembly with first and second ring magnets 34 and a second rotor assembly 26 with first and second stator plates 66, 68. The first and second stator plates 66, 68 are out of phase. The first and second stator plates 66, 68 include axial extending members 66E, 68E and a plurality of axial extending teeth 66F, 68F. The axially extending teeth 66F, 68F are interleaving.

In another aspect of the present invention the first and second stator plates 66, 68 include a plurality of inwardly extending angular teeth 66G, 68G or outwardly extending angular teeth 66H, 68H. FIGS. 33–50 show diagrammatic illustrations of an apparatus with either inwardly extending angular teeth 66G, 68G or outwardly extending angular teeth 66H, 68H. The illustrations show first and second stator plates 66, 68 which are either in phase or out of phase, interleaving or not interleaving teeth 66G, 68G, 66H, 68H and the various magnet arrangements.

Obviously, many modifications and variations of the present invention are possible in light of the above teachings. The invention may be practiced otherwise than as specifically described within the scope of the appended claims.

What is claimed is:

1. An apparatus for measuring the relative displacement between a first shaft and a second shaft, comprising:
   a first rotor assembly being coupled to the first shaft and being centered on an axis;
   at least one magnet having a magnetic field and being disposed on the first rotor assembly;
   a second rotor assembly being coupled to the second shaft, the first and second rotor assemblies being coaxial, the second rotor assembly having a first stator plate and a second stator plate, the first and second stator plates forming a gap and having a plurality of teeth extending in a direction radial of the axis, wherein the plurality of teeth of the first stator plate do not axially intersect with the plurality of teeth of the seconds stator plate; and,
   a sensing device disposed within the gap for sensing a magnetic flux of the magnetic field.

2. An apparatus, as set forth in claim 1, further comprising a compliant member coupled between the first and second shafts for allowing relative movement therebetween.

3. An apparatus, as set forth in claim 1, further comprising a retaining member to hold the first and second stator plates and fixing the relative position thereof, respectively, and being fixedly coupled to the lower shaft.

4. An apparatus, as set forth in claim 1, each stator plate including a circular base section, the plurality of teeth extending from the circular base section.

5. An apparatus, as set forth in claim 1, the first rotor assembly having a circumference and a plurality of slots or flats spaced evenly around the circumference, the apparatus including a plurality of magnets, each magnet being located in one of the slots or flats.

6. An apparatus, as set forth in claim 5, the plurality of magnets being uni-polar.

7. An apparatus, as set forth in claim 5, each magnet having first and second parallel surfaces and four side surfaces, the first and second parallel surfaces being parallel to the axis, at least one pair of opposite edges formed by one of the side surfaces and the first parallel surface being rounded.

8. An apparatus, as set forth in claim 5, each magnet having first and second parallel surfaces and four side surfaces, the first and second parallel surfaces being parallel to the axis, the first and second parallel surfaces being rectangular.

9. An apparatus, as set forth in claim 5, each magnet having first and second parallel surface and four side surfaces, the first and second parallel surfaces being parallel to the axis, the first and second parallel surface being square.

10. An apparatus, as set forth in claim 5, the plurality of magnets being in a single row around the circumference of the first rotor assembly.

11. An apparatus, as set forth in claim 5, the plurality of magnets being in two rows around the circumference of the first rotor assembly.

12. An apparatus, as set forth in claim 1, the first rotor assembly having a circumference, the at least one magnet being a ring magnet.

13. An apparatus, as set forth in claim 12, further comprising a second ring magnet, the first and second ring magnets being in parallel planes perpendicular to the axis.

14. A apparatus for measuring the relative displacement between a first shaft and a second shaft, comprising:
   a first rotor assembly being coupled to the shaft and being centered on an axis, the rotor assembly including a rotor having an inner surface and an outer surface, the outer surface forming at least one slot or flat associated with an outer radius, the inner surface forming at least one support structure associated with an inner radius, the inner radius being larger than the outer radius; and,
   at least one magnet disposed in the at least one slot or flat; and a
   a second rotor assembly being coupled to the second shaft, the first and second rotor assemblies being coaxial, the second rotor assembly having a first stator plate and a second stator plate, the first and second stator plates having a plurality of teeth extending in a direction radial of the axis, wherein the plurality of teeth of the first stator plate do not axially intersect with the plurality of teeth of the seconds stator plate.

15. A rotor assembly, as set forth in claim 14, further comprising a retaining member surrounding the rotor assembly for retaining or adhering the at least one magnet in the respective slot or flat.

16. A rotor assembly, as set forth in claim 15, the retaining member being made from a non-magnetic material.

17. A rotor assembly, as set forth in claim 14, the first rotor assembly including a plurality of magnets located in one of the slots or flats, the plurality of magnets being uni-polar and in a single row around the circumference of the first rotor assembly.

18. An apparatus, as set forth in claim 14, the first rotor assembly including a plurality of magnets located in one of the slots or flats, the plurality of magnets being in two rows around the circumference of the first rotor assembly.

19. An apparatus, as set forth in claim 14, the at least one magnet being a ring magnet.

20. An apparatus, as set forth in claim 15, the retaining member being overmolded the rotor and at least one magnet.

21. An apparatus, as set forth in claim 14, the rotor having a non-continuous inner diameter.

22. An apparatus, as set forth in claim 14, wherein hoop stress is eliminated in the first rotor assembly by having the inner radius larger than the outer radius and a non-continuous inner diameter.

* * * * *